US011905117B2

(12) United States Patent
Clark et al.

(10) Patent No.: US 11,905,117 B2
(45) Date of Patent: Feb. 20, 2024

(54) TRANSPORTING DEVICE

(71) Applicant: Ocado Innovation Limited, Hatfield (GB)

(72) Inventors: Sean Clark, Hatfield (GB); David Sharp, Hatfield (GB)

(73) Assignee: OCADO INNOVATION LIMITED, Hatfield (GB)

(*) Notice: Subject to any disclaimer, the term of this patent is extended or adjusted under 35 U.S.C. 154(b) by 0 days.

(21) Appl. No.: 18/053,137

(22) Filed: Nov. 7, 2022

(65) Prior Publication Data
US 2023/0097961 A1 Mar. 30, 2023

Related U.S. Application Data

(63) Continuation of application No. 17/041,543, filed as application No. PCT/EP2019/057498 on Mar. 26, 2019, now Pat. No. 11,492,203.

(30) Foreign Application Priority Data

Mar. 27, 2018 (GB) ...................... 1804867

(51) Int. Cl.
*B65G 1/137* (2006.01)
*B65G 1/04* (2006.01)
*B60B 19/00* (2006.01)

(52) U.S. Cl.
CPC ......... *B65G 1/1378* (2013.01); *B65G 1/0464* (2013.01); *B60B 19/003* (2013.01);
(Continued)

(58) Field of Classification Search
CPC ... B65G 1/1378; B65G 1/0464; B65G 1/0492
See application file for complete search history.

(56) References Cited

U.S. PATENT DOCUMENTS 1,099,988 A 6/1914 Madsen
4,088,232 A 5/1978 Lilly et al.
(Continued)

FOREIGN PATENT DOCUMENTS

CN 1103772 A 6/1995
CN 1139409 A 1/1997
(Continued)

OTHER PUBLICATIONS

Office Action (Communication) dated Dec. 13, 2022, by the European Patent Office in corresponding European Patent Application No. 19 716 316.5. (15 pages).
(Continued)

Primary Examiner — Kaitlin S Joerger
(74) Attorney, Agent, or Firm — BUCHANAN INGERSOLL & ROONEY PC

(57) ABSTRACT

The present disclosure relates to an apparatus and method for a load handling system such that direction change of a transporting device is more easily and quickly realised. A transporting device includes an omnidirectional driving unit, and is arranged to transport a container, the container being stored in a facility. The facility is arranged to store the container in a plurality of stacks, a plurality of pathways being arranged in cells so as to form a grid-like structure above the stacks, the transporting device being arranged to operate on the grid-like structure and to be driven in a first direction and/or second direction.

19 Claims, 24 Drawing Sheets

(52) U.S. Cl.
CPC .... *B65G 1/0492* (2013.01); *B65G 2201/0235* (2013.01); *B65G 2209/04* (2013.01)

(56) References Cited

U.S. PATENT DOCUMENTS

| | | | |
|---|---|---|---|
| 5,707,199 A | 1/1998 | Faller | |
| 6,654,662 B1 | 11/2003 | Hognaland | |
| 8,600,600 B2 | 12/2013 | Jung | |
| 9,422,108 B2 | 8/2016 | Hognaland | |
| 9,573,416 B1 | 2/2017 | Niemeyer et al. | |
| 9,656,802 B2 | 5/2017 | Hognaland | |
| 9,783,001 B1 | 10/2017 | Panter | |
| 9,856,082 B2 | 1/2018 | Hognaland | |
| 9,862,579 B2 | 1/2018 | Hognaland | |
| 10,000,337 B2 | 6/2018 | Lindbo et al. | |
| 10,086,999 B2 | 10/2018 | Stadie et al. | |
| 10,093,525 B2 | 10/2018 | Hognaland | |
| 10,196,209 B2 | 2/2019 | Lindbo et al. | |
| 10,364,098 B2 | 7/2019 | Lindbo et al. | |
| 10,435,243 B2 | 10/2019 | Schmidt et al. | |
| 10,474,140 B2 | 11/2019 | Hognaland | |
| 10,474,141 B2 | 11/2019 | Stadie et al. | |
| 10,494,239 B2 | 12/2019 | Hognaland | |
| 10,538,388 B2 | 1/2020 | Clarke et al. | |
| 10,549,914 B2 | 2/2020 | Clarke et al. | |
| 10,551,828 B2 | 2/2020 | Hognaland | |
| 10,577,178 B2 | 3/2020 | Lindbo et al. | |
| 10,597,229 B2 | 3/2020 | Pedrazzini | |
| 10,661,991 B2 | 5/2020 | Lindbo et al. | |
| 10,696,478 B2 | 6/2020 | Hognaland | |
| 10,752,440 B2 | 8/2020 | Lindbo et al. | |
| 10,766,698 B2 | 9/2020 | Lindbo et al. | |
| 10,829,302 B2 | 11/2020 | Lindbo et al. | |
| 10,901,404 B2 | 1/2021 | Stadie et al. | |
| 10,913,602 B2 | 2/2021 | Lindbo et al. | |
| 10,955,834 B2 | 3/2021 | Stadie et al. | |
| 10,961,051 B1 | 3/2021 | Lindbo et al. | |
| 2013/0151043 A1 | 6/2013 | Jung | |
| 2015/0127143 A1 | 5/2015 | Lindbo et al. | |
| 2015/0307276 A1 | 10/2015 | Hognaland | |
| 2016/0129587 A1 | 5/2016 | Lindbo et al. | |
| 2016/0145058 A1 | 5/2016 | Lindbo | |
| 2016/0194151 A1 | 7/2016 | Lindbo et al. | |
| 2016/0304278 A1 | 10/2016 | Hognaland | |
| 2016/0375723 A1 | 12/2016 | Jochim et al. | |
| 2017/0129706 A1 | 5/2017 | Hognaland | |
| 2017/0267451 A1 | 9/2017 | Pedrazzini | |
| 2017/0291803 A1 | 10/2017 | Hognaland | |
| 2017/0305668 A1 | 10/2017 | Bestic et al. | |
| 2017/0355524 A1 | 12/2017 | Hognaland | |
| 2018/0035625 A1 | 2/2018 | Lindbo et al. | |
| 2018/0037411 A1 | 2/2018 | Lindbo et al. | |
| 2018/0044110 A1 | 2/2018 | Clarke et al. | |
| 2018/0044111 A1 | 2/2018 | Clarke et al. | |
| 2018/0050869 A1 | 2/2018 | Lindbo et al. | |
| 2018/0051459 A1 | 2/2018 | Clarke et al. | |
| 2018/0072546 A1 | 3/2018 | Hognaland | |
| 2018/0075402 A1 | 3/2018 | Stadie et al. | |
| 2018/0086559 A1 | 3/2018 | Lindbo et al. | |
| 2018/0086560 A1 | 3/2018 | Schmidt et al. | |
| 2018/0093828 A1 | 4/2018 | Lindbo et al. | |
| 2018/0178980 A1 | 6/2018 | Lindbo et al. | |
| 2018/0178981 A1 | 6/2018 | Lindbo et al. | |
| 2018/0237221 A1 | 8/2018 | Lindbo et al. | |
| 2018/0273297 A1 | 9/2018 | Wagner et al. | |
| 2018/0276606 A1 | 9/2018 | Stadie et al. | |
| 2018/0276607 A1 | 9/2018 | Stadie et al. | |
| 2018/0276608 A1 | 9/2018 | Stadie et al. | |
| 2018/0282066 A1 | 10/2018 | Wagner et al. | |
| 2019/0002255 A1 | 1/2019 | Hognaland | |
| 2019/0019707 A1 | 1/2019 | Suzuki | |
| 2019/0161273 A1* | 5/2019 | Ingram-Tedd | B65G 1/0464 |
| 2019/0179295 A1 | 6/2019 | Hognaland | |
| 2019/0225436 A1 | 7/2019 | Lindbo et al. | |
| 2019/0241362 A1 | 8/2019 | Lindbo et al. | |
| 2019/0320770 A1 | 10/2019 | Mckinnon | |
| 2020/0012268 A1 | 1/2020 | Stadie et al. | |
| 2020/0031640 A1 | 1/2020 | Hognaland | |
| 2020/0130934 A1 | 4/2020 | Clarke et al. | |
| 2020/0140196 A1 | 5/2020 | Clarke et al. | |
| 2020/0231381 A1 | 7/2020 | Lindbo et al. | |
| 2020/0262649 A1 | 8/2020 | Hognaland | |
| 2020/0307908 A1 | 10/2020 | Lindbo et al. | |
| 2020/0324971 A1 | 10/2020 | Ingram-tedd et al. | |
| 2020/0361707 A1 | 11/2020 | Lindbo et al. | |
| 2020/0391942 A1 | 12/2020 | Lindbo et al. | |
| 2020/0399060 A1 | 12/2020 | Whelan et al. | |
| 2021/0047111 A1 | 2/2021 | Lindbo et al. | |
| 2021/0086992 A1 | 3/2021 | Lindbo et al. | |
| 2021/0086993 A1 | 3/2021 | Lindbo et al. | |
| 2021/0114811 A1 | 4/2021 | Clark et al. | |
| 2021/0149382 A1 | 5/2021 | Stadie et al. | |

FOREIGN PATENT DOCUMENTS

| | | |
|---|---|---|
| CN | 1099988 C | 1/2003 |
| CN | 103158433 A | 6/2013 |
| CN | 205397170 U | 7/2016 |
| CN | 106241154 A | 12/2016 |
| CN | 106414278 A | 2/2017 |
| CN | 106662874 A | 5/2017 |
| CN | 107000935 A | 8/2017 |
| CN | 206466554 U | 9/2017 |
| CN | 107428464 A | 12/2017 |
| CN | 107438571 A | 12/2017 |
| CN | 107466203 A | 12/2017 |
| CN | 107499806 A | 12/2017 |
| CN | 107697180 A | 2/2018 |
| DE | 102016003665 A1 | 10/2016 |
| EP | 2308777 A1 | 4/2011 |
| EP | 3050824 A1 | 8/2016 |
| GB | 2541775 A | 3/2017 |
| GB | 2573874 A | 11/2019 |
| JP | 2004129435 A | 4/2004 |
| JP | 2018504337 A | 2/2018 |
| NO | 317366 B1 | 10/2004 |
| WO | 9849075 A1 | 11/1998 |
| WO | 2015019055 A1 | 2/2015 |
| WO | 2015185628 A2 | 12/2015 |
| WO | 2016120075 A1 | 8/2016 |
| WO | 2017153583 A1 | 9/2017 |
| WO | 2017153853 A1 | 9/2017 |

OTHER PUBLICATIONS

First Office Action dated Aug. 2, 2022, by the Japanese Patent Office in corresponding Japanese Patent Application No. 2020-550673, and an English Translation of the Office Action. (9 pages).

First Office Action dated Nov. 16, 2021, by the Japanese Patent Office in corresponding Japanese Patent Application No. 2020-550673, and an English Translation of the Office Action. (11 pages).

International Search Report (PCT/ISA/210) dated Aug. 10, 2019, by the European Patent Office as the International Searching Authority for International Application No. PCT/EP2019/057498.

Office Action (Combination Search and Examination Report) dated Sep. 24, 2021, by the Great Britain Patent Office in corresponding Great Britain Patent Application No. GB2104912.7. (3 pages).

Office Action (Examination Report No. 2) dated Nov. 24, 2021, by the Australian Patent Office in corresponding Australian Patent Application No. 2019246119. (3 pages).

Office Action (Request for the Submission of an Opinion) dated Sep. 20, 2022, by the Korean Patent Office in corresponding Korean Patent Application No. 10-2020-7029332, and an English Translation of the Office Action. (10 pages).

Office Action dated Aug. 9, 2022, by the Great Britain Patent Office in corresponding Great Britain Patent Application No. GB2104912.7. (3 pages).

Office Action dated Dec. 17, 2021, by the Chinese Patent Office in corresponding Chinese Patent Application No. 201980022527.5. (9 pages).

(56) References Cited

OTHER PUBLICATIONS

Office Action dated Oct. 25, 2021, by the Canadian Patent Office in corresponding Canadian Patent Application No. 3,094,754. (3 pages).
Written Opinion (PCT/ISA/237) dated Aug. 10, 2019, by the European Patent Office as the International Searching Authority for International Application No. PCT/EP2019/057498.
Written Opinion dated Sep. 5, 2022, by the Japanese Patent Office, in corresponding Japanese Application No. 2020-550673, and an English Translation. (4 pages).
Office Action (Examination Report No. 1) dated May 12, 2021, by the Australian Patent Office in corresponding Australian Patent Application No. 2019246119. 3 pages.
Office Action dated May 31, 2021, by the Chinese Patent Office in corresponding Chinese Patent Application No. 201980022527.5. 10 pages.

\* cited by examiner

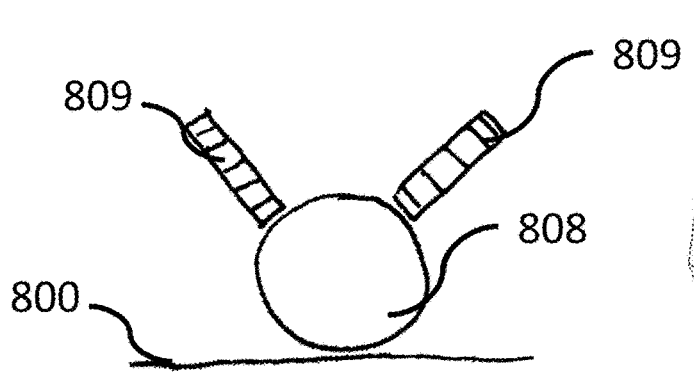
Figure 8(d)i
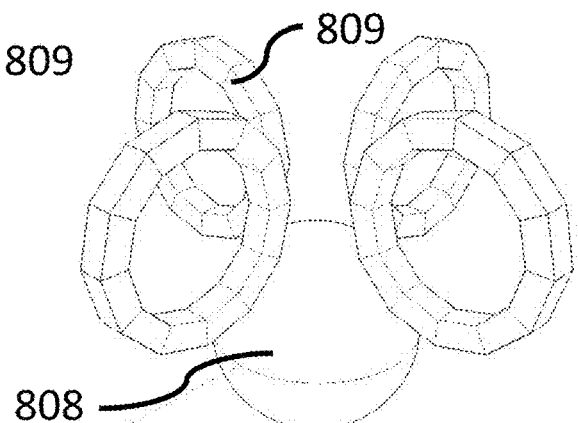
Figure 8(d)ii
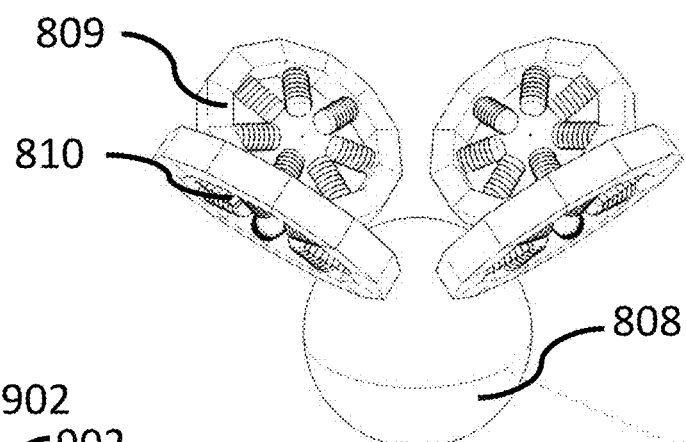
Figure 8(d)iii
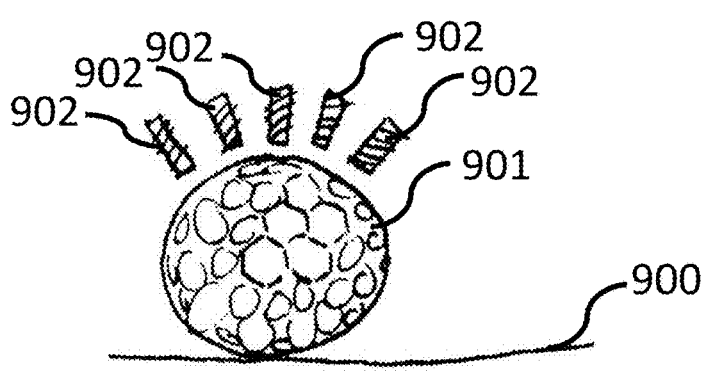
Figure 9(a)
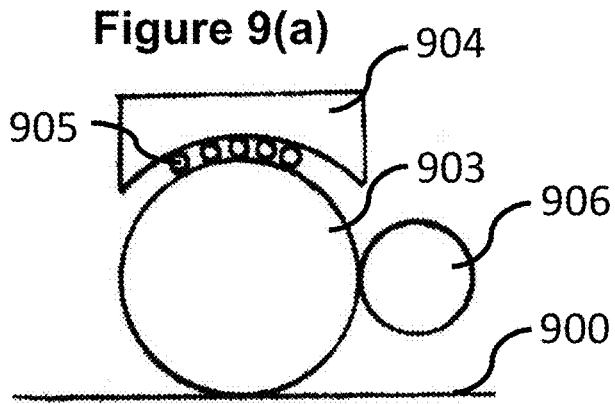
Figure 9(b)

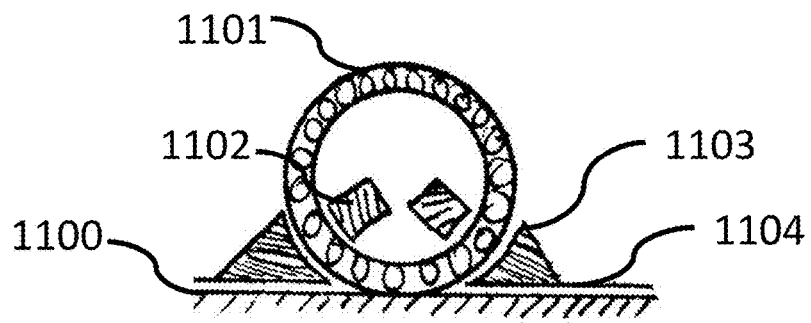
Figure 11(a)i
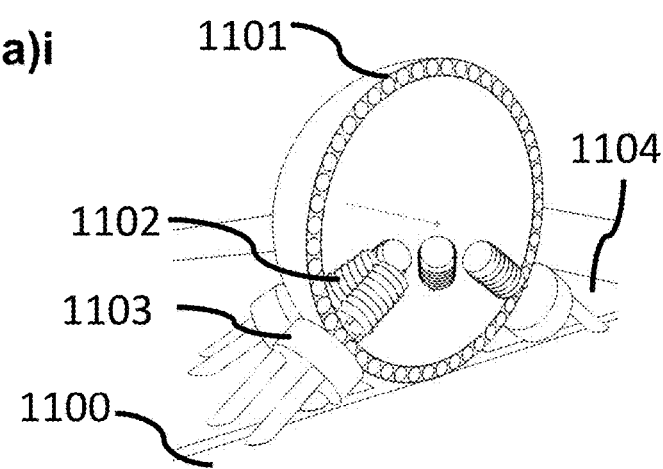
Figure 11(a)ii
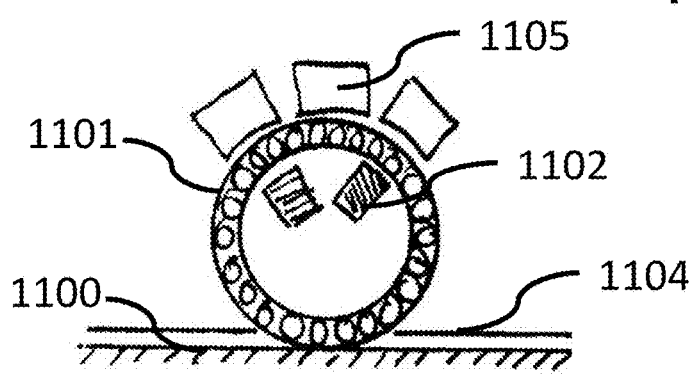
Figure 11(a)iii
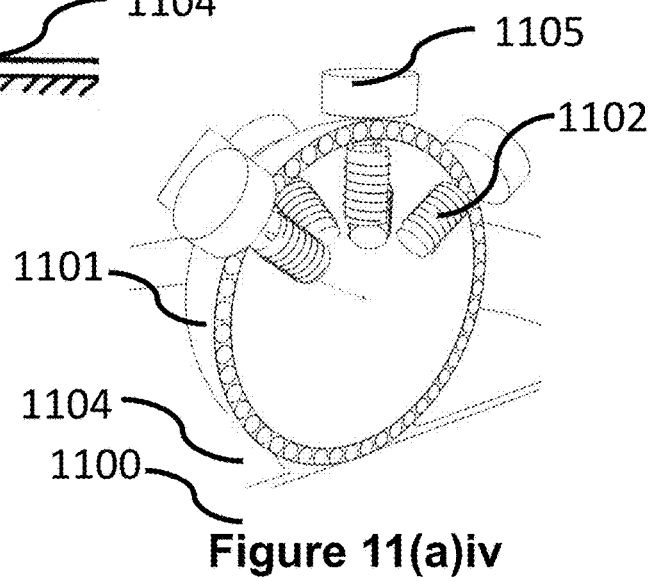
Figure 11(a)iv

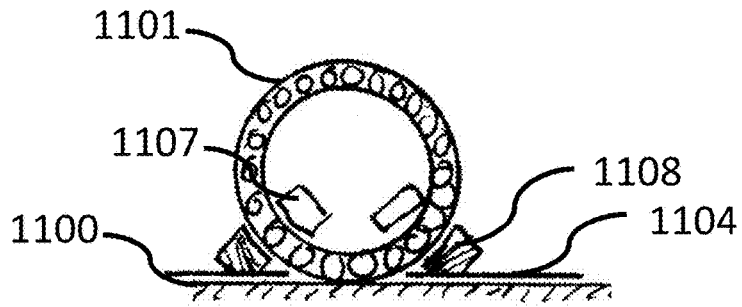
Figure 11(b)i
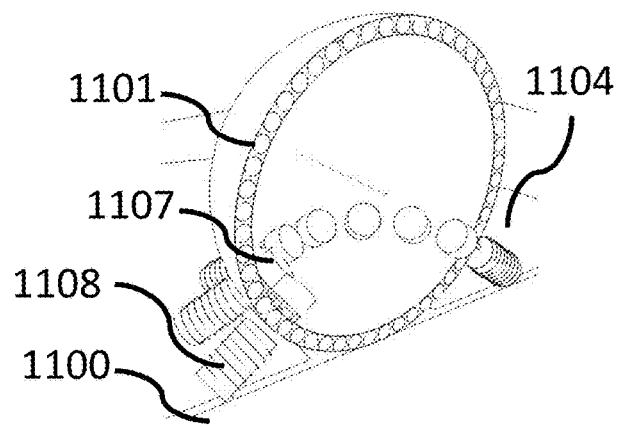
Figure 11(b)ii
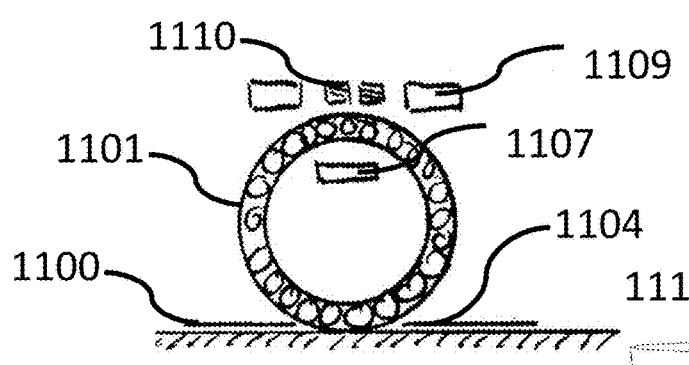
Figure 11(b)iii
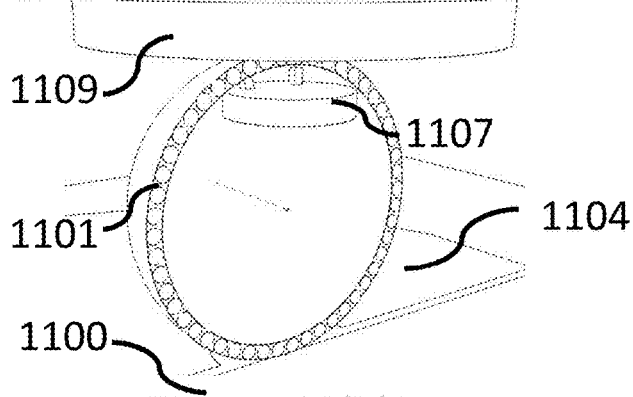
Figure 11(b)iv

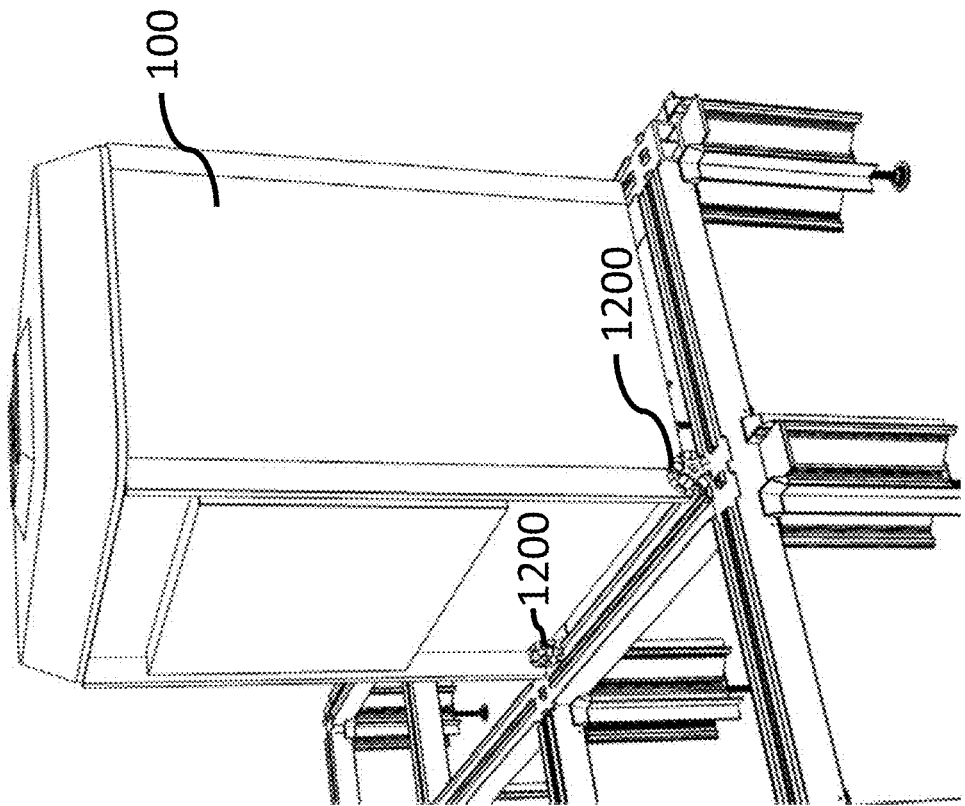
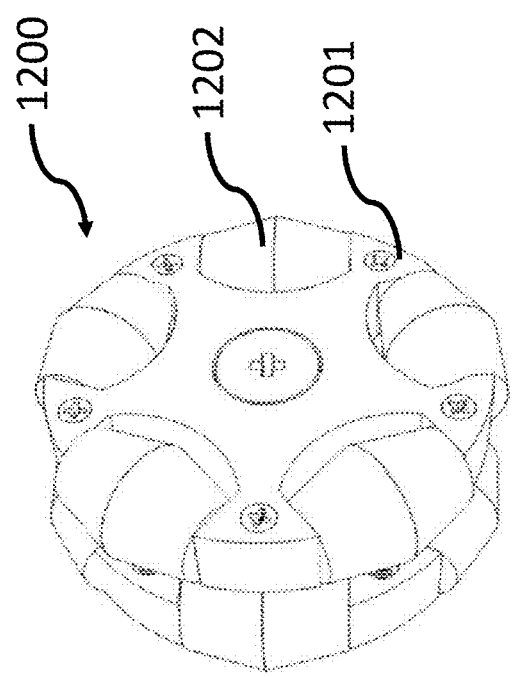
Figure 12(a)
Figure 12(b)

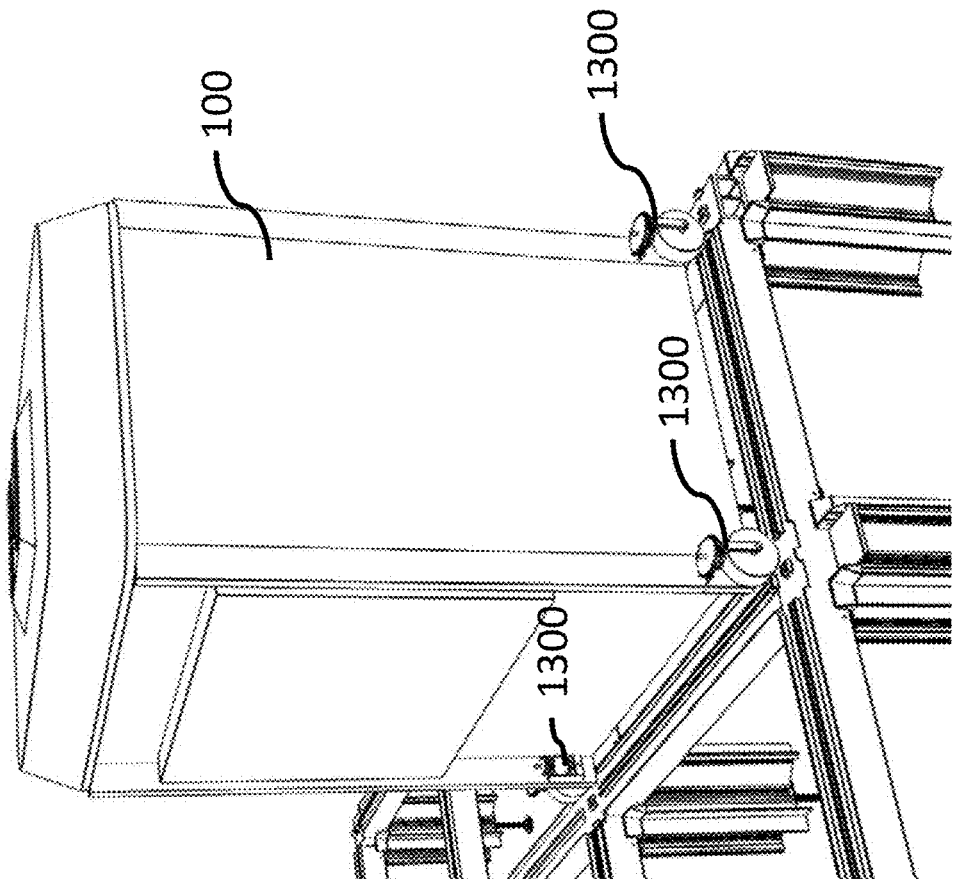
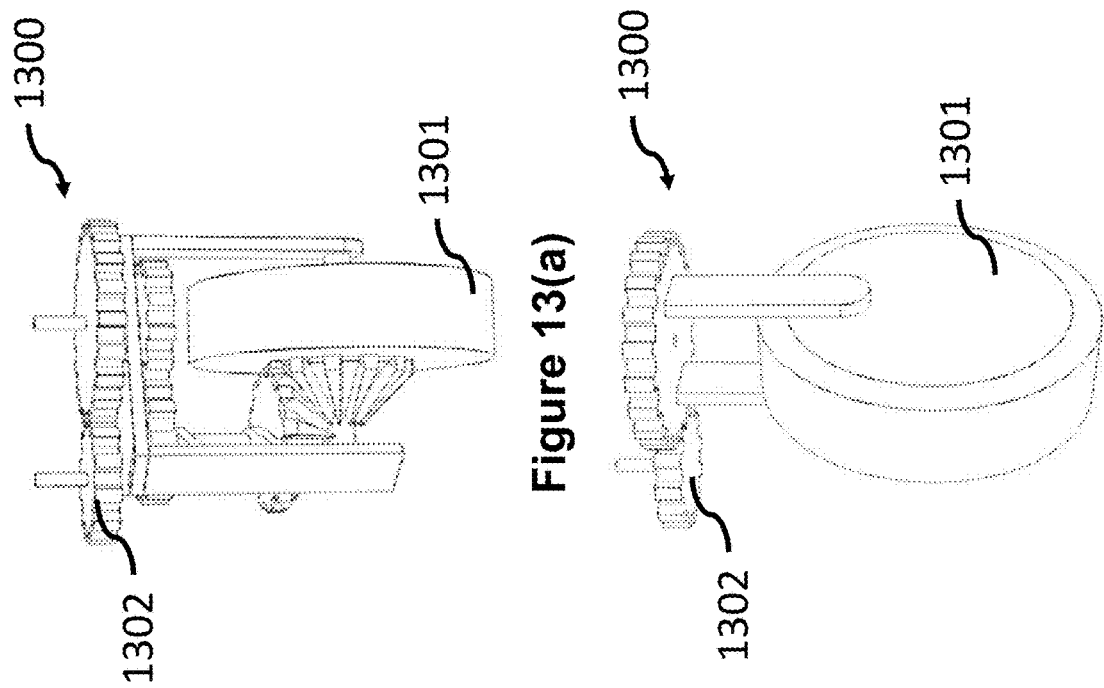
Figure 13(a)
Figure 13(b)
Figure 13(c)

TRANSPORTING DEVICE

This application claims priority to U.S. patent application Ser. No. 17/041,543 filed 25 Sep. 2020, which claims priority to International Application No. PCT/EP2019/057498 filed 26 Mar. 2019, which claims priority from UK Patent Application No. 1804867.8 filed 27 Mar. 2018, the content of each prior application is hereby being incorporated by reference in its entirety.

TECHNICAL FIELD

The present invention relates generally to the field of transporting devices. More specifically to a transporting device arranged to move omnidirectionally.

BACKGROUND

Online retail businesses selling multiple product lines/batches/lots, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices (also known as 'transporting devices') operative on tracks located on the top of the frame structure. The load handling devices lift bins or containers out from the stacks, multiple load handling devices co-operating to access bins or containers located in the lowest positions of the stack. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. FIG. 1 is a schematic perspective view of the framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3(a) and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 3(a) and 3(b) are schematic cross sectional views of a load handling device 30 depositing a bin 10, and FIG. 3(c) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10/container. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown) or other communication mechanism.

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 may include specific locations, known as ports, at which bins 10 can be transferred into or out of the system. An additional conveyor system (not shown) is associated with each port, so that bins 10 transported to a port by a load handling device 30 can be transferred to another location by the conveyor system, for example to a picking station (not shown). Similarly, bins 10 can be moved by the conveyor system to a port from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10. This is achieved in an operation referred to hereafter as "digging".

Referring to FIG. 4, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port 24 for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

Moreover, a direction change of the transporting device is difficult to achieve. In particular, the above described system uses a complicated and expensive direction change mechanism to raise and lower wheels on two faces of the transporting device such that only one set of wheels is in contact with the rails at a given moment to thereby permit a transporting device to move in orthogonal directions. These existing direction change mechanisms slow down operation of the transporting device such that significant time is spent not moving laterally and instead changing direction. Therefore a quicker and easier arrangement for direction change is desirable.

SUMMARY

In view of the problems in known load handling systems, the present invention aims to provide an apparatus and method for such a load handling system such that direction change of the transporting device is more easily, and more quickly, realised.

In general terms, the invention introduces an omnidirectional driving unit which permits the transporting device to more easily move in more than one direction.

According to the present invention there is provided a transporting device arranged to transport a container, the container being stored in a facility, the facility arranged to store the container in a plurality of stacks, the facility comprising a plurality of pathways arranged in cells so as to form a grid-like structure above the stacks, wherein the grid-like structure extends in a first direction and in a second direction, the transporting device arranged to operate on the grid-like structure. The transporting device comprises an omnidirectional driving unit arranged to drive the transporting device in the first direction and/or the second direction.

The present invention also provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces and a plurality of stacks of containers located beneath the rails, and arranged such that each stack is located within a footprint of a single grid space. The storage system further comprises at least one transporting device as previously described, the at least one transporting device being arranged to move in the X and/or Y directions, above the stacks.

The present invention also provides a method of controlling a transporting device arranged to transport a container, the container being stored in a facility, the facility arranged to store the container in a plurality of stacks, the facility comprising a plurality of pathways arranged in cells so as to form a grid-like structure above the stacks, wherein the grid-like structure extends in a first direction and in a second direction, the transporting device arranged to operate on the grid-like structure. The method comprises driving, omnidirectionally, the transporting device in the first direction and/or the second direction.

The present invention also provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces, a plurality of stacks of containers located beneath the rails, and arranged such that each stack is located within a footprint of a single grid space, and at least one transporting device, the at least one transporting device being arranged to selectively move laterally in the X and Y directions, above the stacks on the rails. The at least one transporting device comprises a first set of wheels positioned on a first face of the transporting device arranged to drive in the X-direction and a second set of wheels positioned on a second face of the transporting device arranged to drive in the Y-direction, the second face being substantially perpendicular to the first face, the first set of parallel rails comprises a region in which, when the second set of wheels is driven, the first set of wheels can move in the Y-direction, and the second set of parallel rails comprises a region in which, when the first set of wheels is driven, the second set of wheels can move in the X-direction.

The present invention also provides method of controlling a storage system, the storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces, a plurality of stacks of containers located beneath the rails, and arranged such that each stack is located within a footprint of a single grid space, and at least one transporting device. The at least one transporting device comprises a first set of wheels positioned on a first face of the transporting device arranged to drive in the X-direction and a second set of wheels positioned on a second face of the transporting device arranged to drive in the Y-direction, the second face being substantially perpendicular to the first face, wherein the first set of parallel rails comprises a region in which, when the second set of wheels is driven, the first set of wheels can move in the Y-direction, and the second set of parallel rails comprises a region in which, when the first set of wheels is driven, the second set of wheels can move in the X-direction. The method comprises selectively moving the transporting device laterally in the X and Y directions.

BRIEF DESCRIPTION OF THE DRAWINGS

Embodiments of the invention will now be described by way of example only with reference to the accompanying drawings, in which like reference numbers designate the same or corresponding parts, and in which:

FIGS. 8(a)-8(d)iii show examples of implementing the ball in the transporting device.

FIGS. 9(a) and 9(b) show further examples of implementing the ball in the transporting device.

FIGS. 11(a)i-11(b)iv show yet further examples of implementing the ball in the transporting device.

FIGS. 12(a) and 12(b) shows a second example of the omnidirectional driving unit comprising an omniwheel.

FIGS. 13(a)-13(c) shows a third example of the omnidirectional driving unit comprising a steerable wheel.

DETAILED DESCRIPTION OF EMBODIMENTS

First Embodiment

Figure 1:
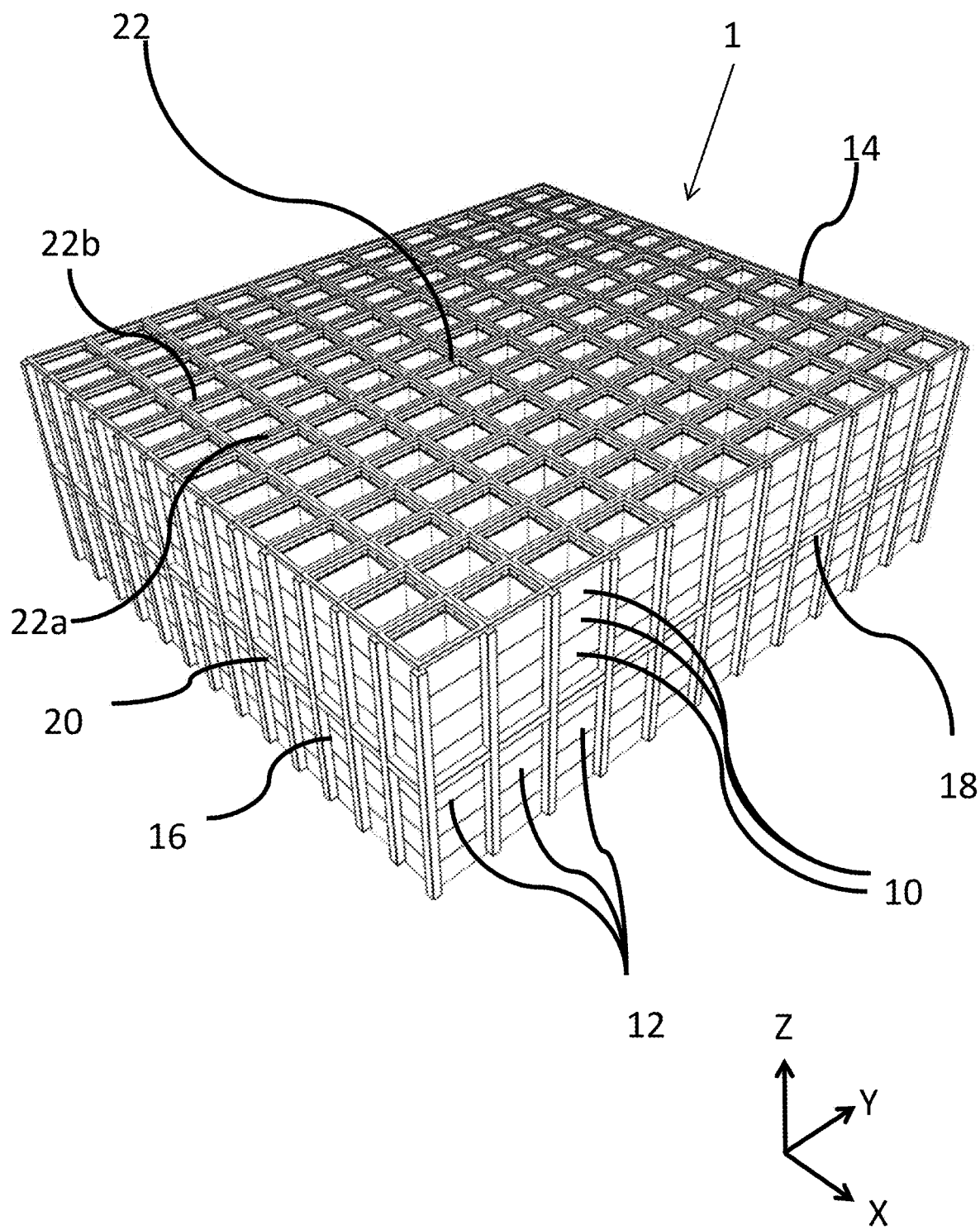
FIG. 1 is a schematic diagram of a framework structure according to a known system.
Figure 2:
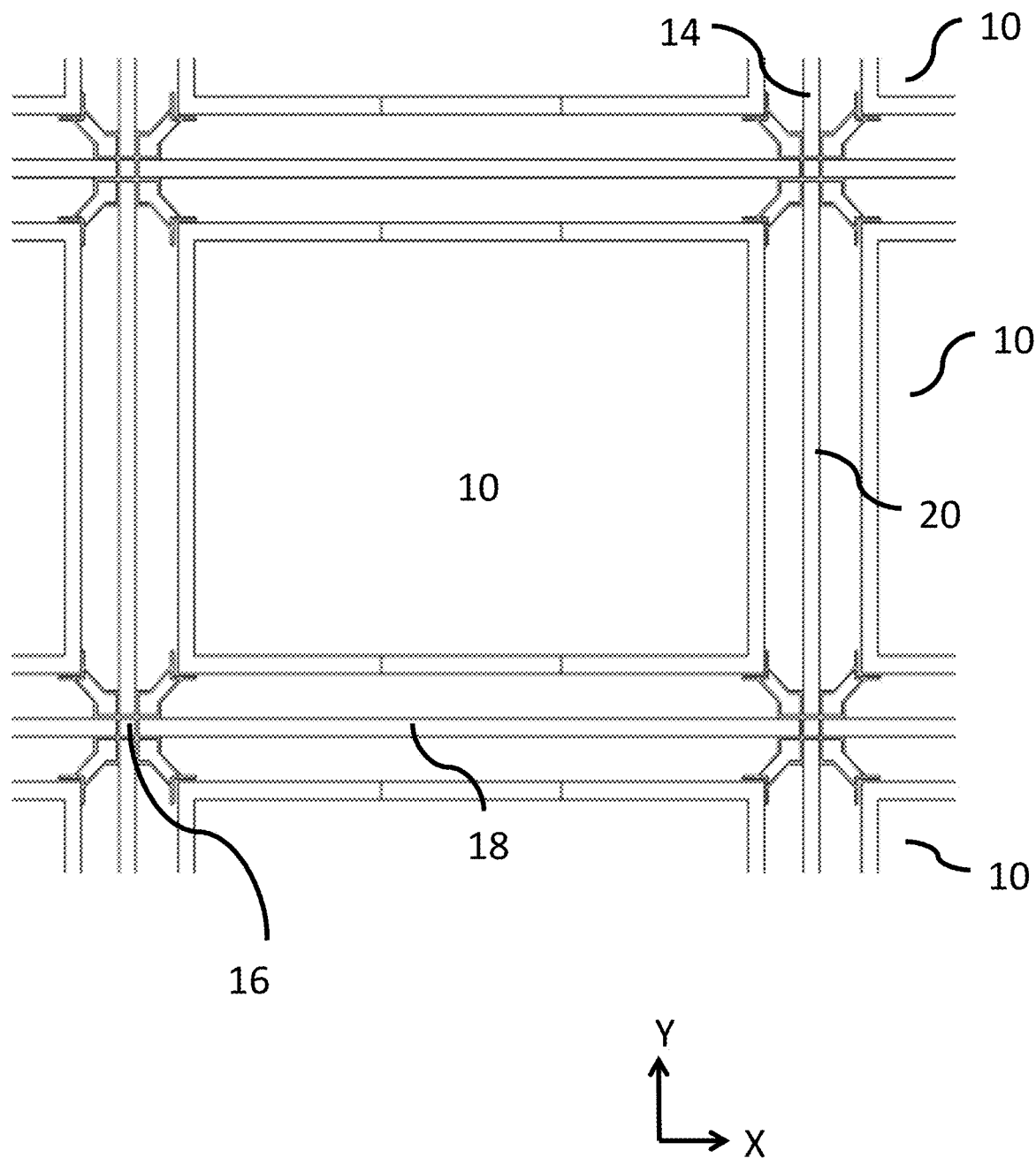
FIG. 2 is a schematic diagram of a top-down view showing a stack of bins arranged within the framework structure of FIG. 1.
Figure 3C:
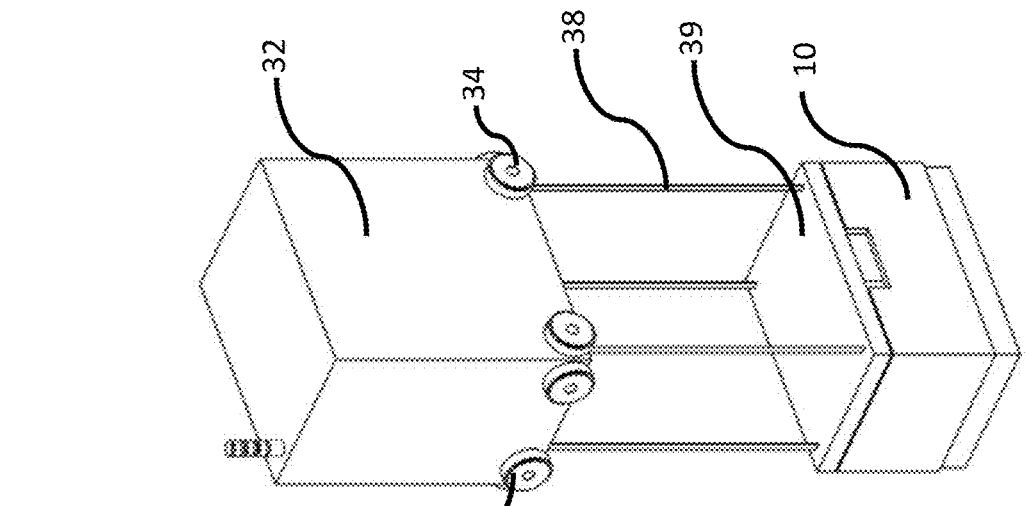
FIGS. 3(a) and 3(b) are schematic perspective views of a load handling device depositing a bin and FIG. 3(c) is a schematic front perspective view of a load handling device lifting a bin.
Figure 3B:
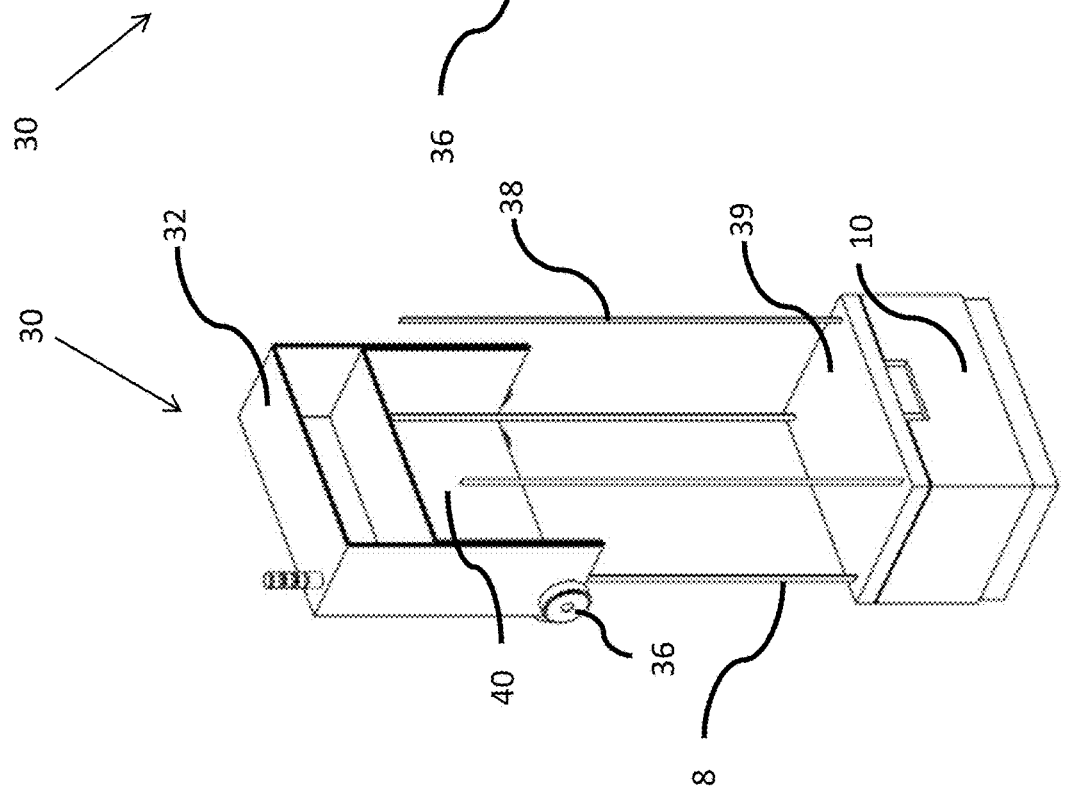
Figure 3A:
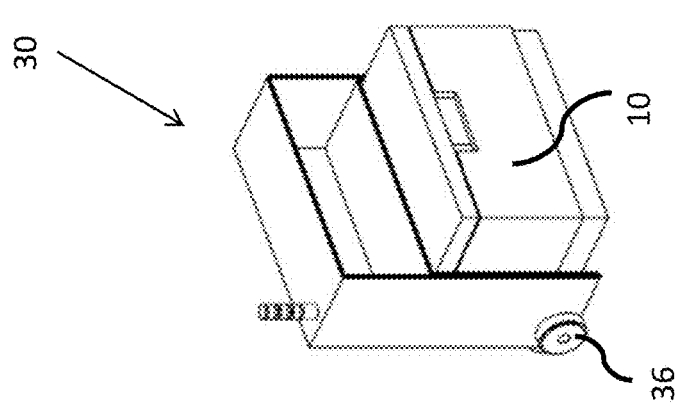
Figure 4:
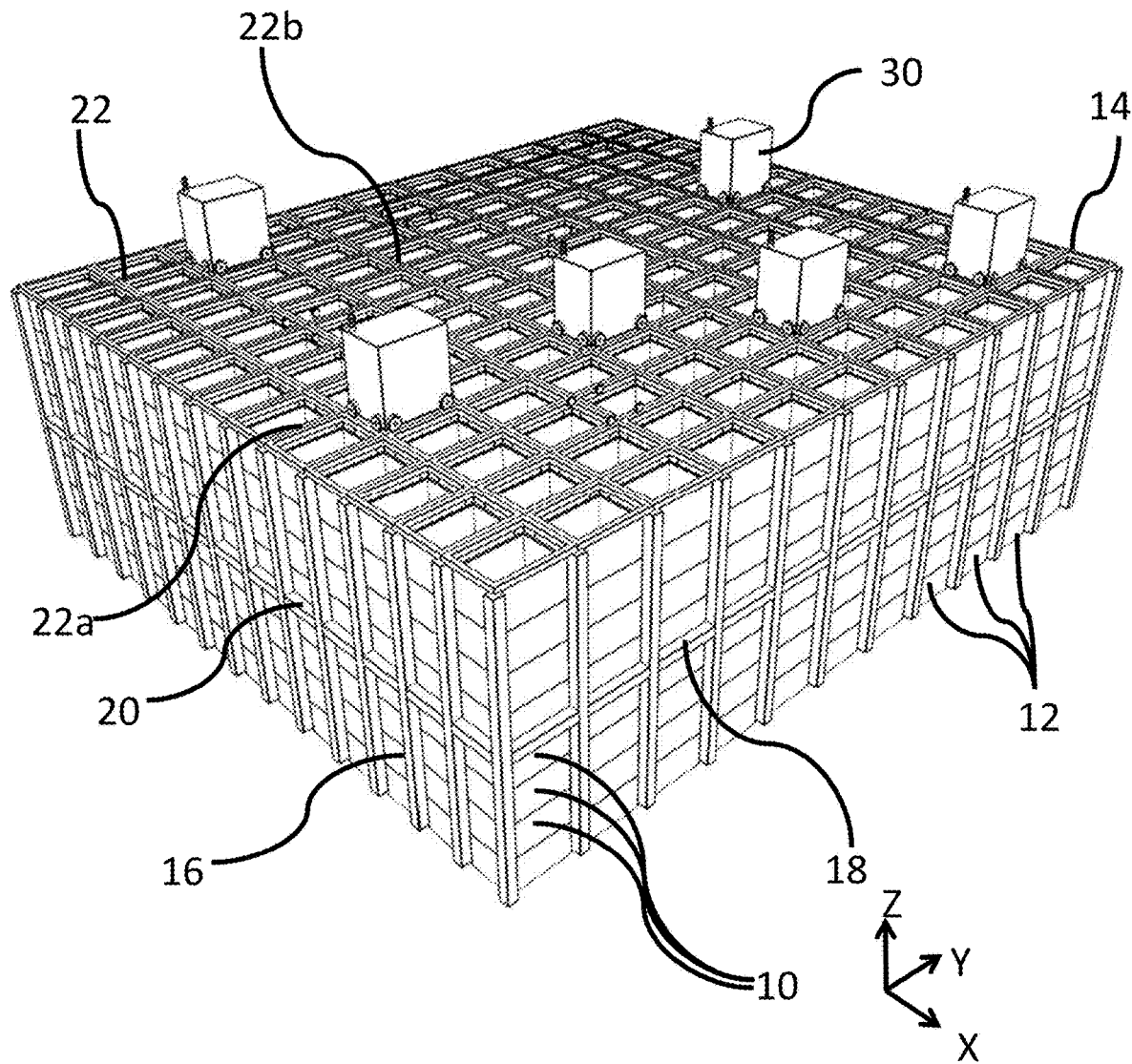
FIG. 4 is a schematic diagram of a system showing load handling devices operating on the framework structure.
Figure 5:
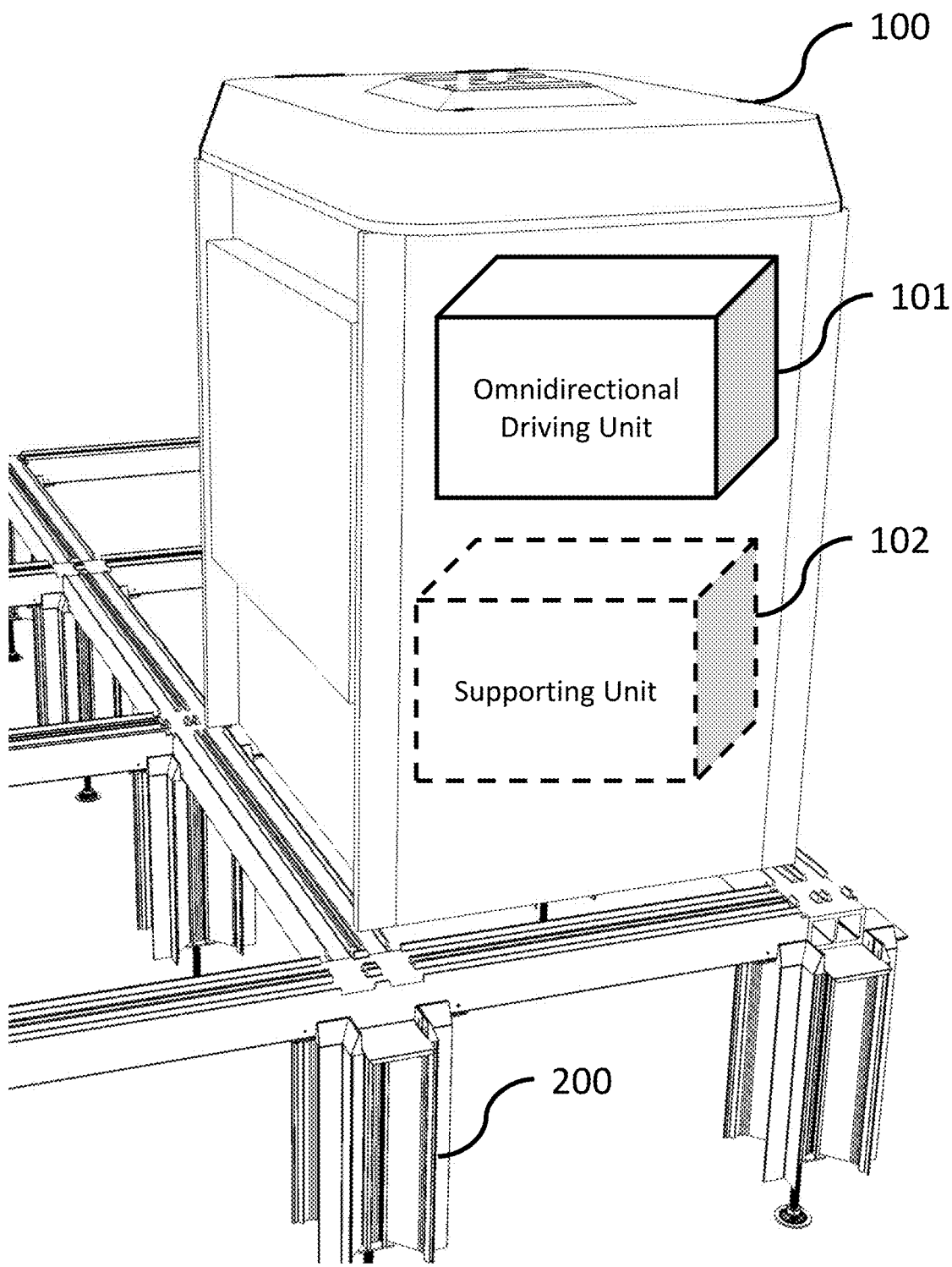
FIG. 5 is a schematic diagram of a transporting device according to a first embodiment of the present invention.

FIG. 5 shows a transporting device 100 according to a first embodiment of the present invention. The transporting device 100 is arranged to operate on a grid 200. The grid 200 comprises a first set of parallel rails extending in a first direction (for example in an X-direction) and a second set of parallel rails extending in a second direction (for example in a Y-direction). Where the first set and the second set of rails meet forms an intersection. The transporting device 100 is arranged to move in the first direction and the second direction above the rails. Below the rails may be stacked containers for retrieval/deposition by the transporting device 100. The transporting device 100 achieves this by way of a receiving cavity (not shown) to receive the container.

The grid 200 thereby forms a two-dimensional array of cells over which the transporting device 100 may move and stop to retrieve/deposit a container.

In this regard, the transporting device 100 of the first embodiment comprises an omnidirectional driving unit 101 arranged to drive the transporting device 100 in a first direction and/or a second direction. The omnidirectional driving unit 101 provides a number of advantages compared to the existing solutions as described previously. In particular, the omnidirectional driving unit 101 permits the transporting device 100 to change directions from the first direction to the second direction or from the second direction to the first direction without the requirement to move wheels of the transporting device up or down (i.e. in a third direction—for example a Z direction). As will be described later, the present inventors have found that the omnidirectional driving unit 101 may be implemented in a number of ways, each with particular advantages.

The transporting device 100 may further comprise a supporting unit 102 arranged to support the transporting device 100 above the grid 200. The supporting unit 102 may thereby be arranged to ensure that the body of the transporting device 100 (in other words, the features of the transporting device 100 excluding the supporting unit 102) is placed at an appropriate distance from the grid 200 so that the transporting device 100 may conduct its operations of moving by way of the omnidirectional driving unit 101 and/or retrieving/depositing a container.

Figure 6:
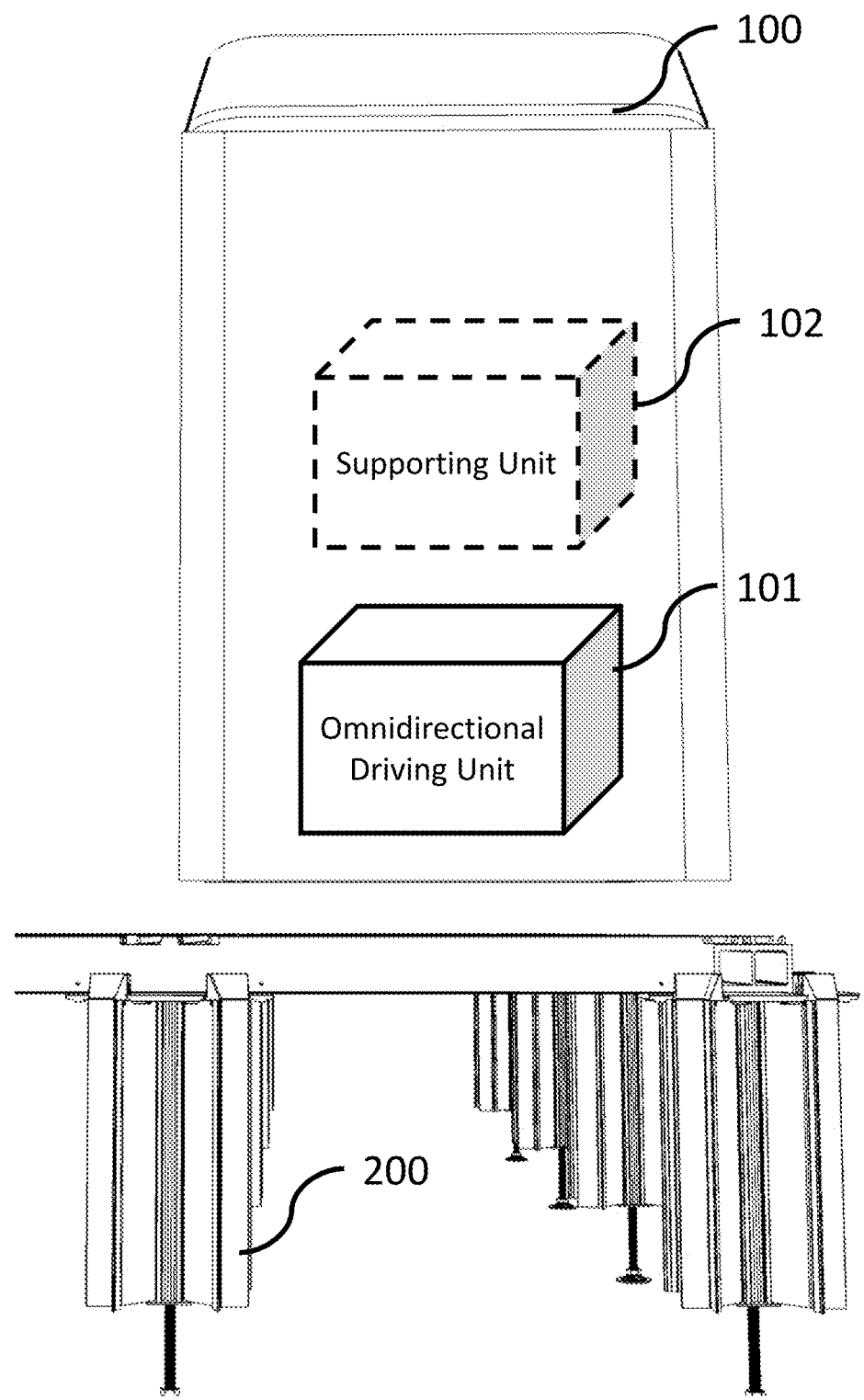
FIG. 6 is a schematic diagram of a side view of a transporting device according to a first embodiment of the present invention.

FIG. 6 shows a side view of the transporting device 100 shown in FIG. 5. As explained, the transporting device 100 is arranged to operate above the grid 200. Therefore, when moving across the grid 200 the transporting device 100 may utilise the omnidirectional driving unit 101 to move in at least one direction. The omnidirectional driving unit 101 is arranged such that wheels need not be lifted up/dropped down onto the rails so as to change direction. In this way, the speed of direction change of the transporting device 100 may be increased. The transporting device 100 may further comprise a supporting unit 102 arranged to support the transporting device 100 at an operating distance from the grid 200. In an example situation, the supporting unit 102 will be arranged to support the transporting device 100 against the force of gravity which would otherwise pull the chassis/body of the transporting device 100 onto the grid and prevent the omnidirectional driving unit 101 from moving the transporting device 100. However, in low/micro gravity situations the supporting unit may instead be required to ensure that the transporting device 100 remains in a relatively close proximity to the grid 200 and does not float free of an appropriate operating distance of the transporting device 100 from the grid 200. The present inventors have considered a number of way of implementing the supporting unit 102, some of which contact the grid 200 and thereby support the transporting device 100 against the force of gravity. In other example, they have utilised flotation techniques to counteract the force of gravity using jets of air expelled from the bottom of the transporting device 100 and/or magnetic flotation techniques.

The present inventors also realised benefits when the omnidirectional driving unit 101 and supporting unit 102 are integrally formed. In this way the omnidirectional driving unit 101 can be arranged to both provide a driving force on the transporting device 100 and implement the supporting unit 102 to keep the transporting device 100 at an appropriate operating distance from the grid 200. However, an omnidirectional driving unit 101 may be used in combination with a different supporting unit 102 to provide the best features of each solution, as will be described later.

In FIGS. 7 to 19 a number of examples of implementing the omnidirectional driving unit 101 and/or the supporting unit 102 will be described.

Figure 7:
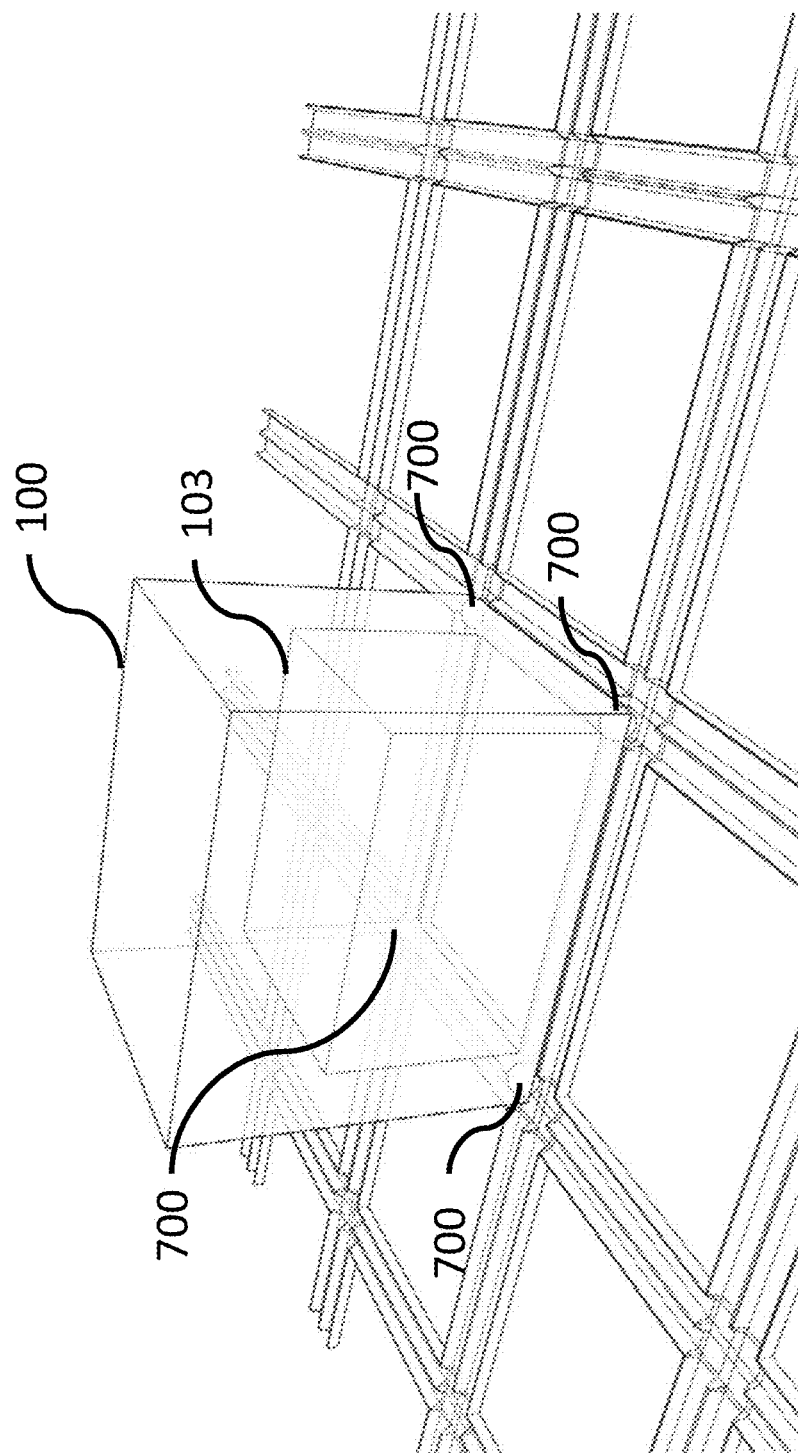
FIG. 7 shows a first example of the omnidirectional driving unit comprising a ball.

FIG. 7 shows a transporting device 100 according to the first embodiment of the present invention. For clarity, the transporting device 100 is shown with a cavity 103 arranged to receive a bin/container from the plurality of stacks.

In this first example of the first embodiment, the omnidirectional driving unit 101 is provided by way of a substantially ball-shaped rolling means 700 arranged to roll in both a first direction and a second direction. For example, a ball may be employed given its substantially spherical shape.

For ease of reference throughout the rest of the description a substantially ball-shaped rolling means 700 will be referred to as "a ball" although the skilled person will understand that a substantially ball-shaped rolling means may not be limited to a ball. Optimally, the balls 700 are provided at each corner of the transporting device 100 so as to drive the transporting device 100 omnidirectionally across the grid 200. As will be appreciated, the balls 700 may be placed in any location around the transporting device 100 that allows for omnidirectional movement. As shown in FIG. 7, the balls 700 are shown placed on the grid 200 by way of channels in the rails of the grid. This advantageously permits the balls to more easily travel along the rails without the necessity to steer the balls on the rails. The balls 700 thereby provide a driving force to drive the transporting device 100 in a first direction or a second direction across the grid 200.

Optionally, the supporting unit 102 may be provided by way of the balls 700 to keep the transporting device 100 at an operating distance from the grid. Therefore the balls 700 may be used to both support the transporting device 100 at an operating distance from the grid and to be driven to thereby move the transporting device 100 across the grid 200.

FIGS. 8(a) to 11(b)iv show examples of driving solutions and mounting solutions for the balls 700 to the transporting device 100 which thereby provide the necessary driving force and/or support force to move/support the transporting device 100.

Figure 8A:
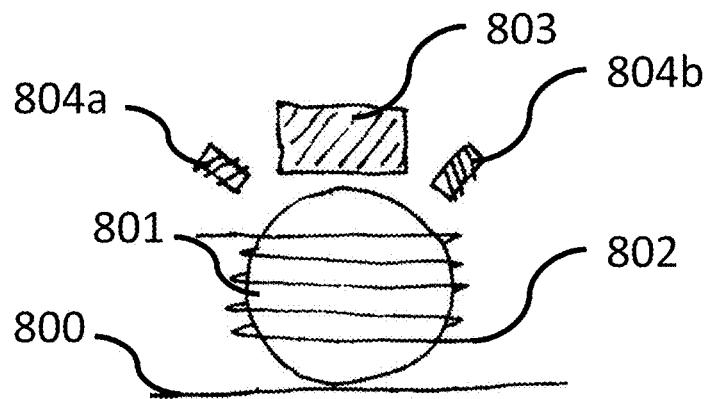

FIG. 8(a) shows a first example of implementing a ball 700 as the supporting unit 102. In FIG. 8(a) a ball 801 is formed of a material susceptible to being magnetised by a coil 802. In this way the ball 801 forms an electromagnet. The ball operates on the surface 800 which, for example, may be the surface of the rails of the grid 200. The ball 801 magnetised by way of the coil 802 to repel a permanent magnet 803 to thereby create a frictionless bearing. The permanent magnet 803 may be mounted to the chassis/body of the transporting device 100. Thereby, the repulsive force effected on the permanent magnet 803 may be used as a supporting force for the transporting device 100 to ensure that the transporting device 100 is maintained at an appropriate distance from the grid. To ensure the ball 801 remains appropriately positioned on the permanent magnet 803, balancing electromagnets 804 are arranged around the permanent magnet 803 and mounted to the chassis/body of the transporting device 100. In this way the positioning of the ball 801 may be maintained.

Figure 8B:
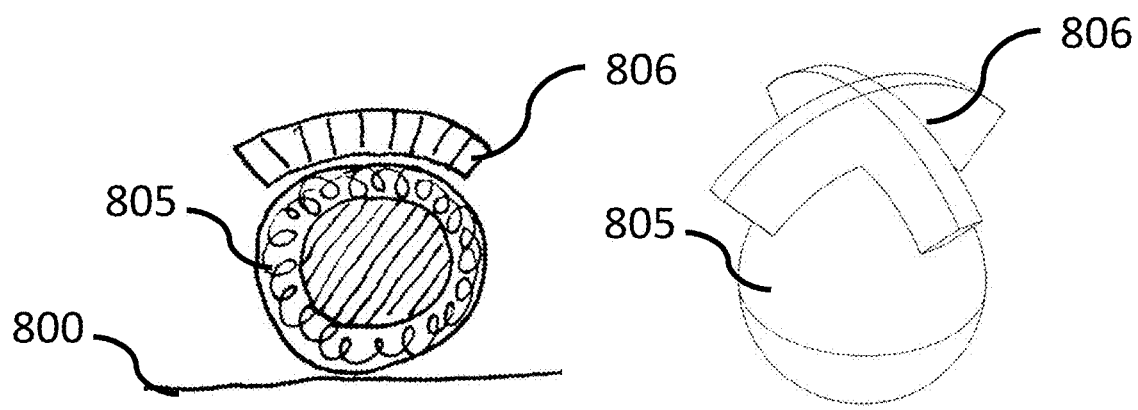

FIG. 8(b) shows a second example of implementing a ball 700 as the omnidirectional driving unit 101. FIG. 8(b) comprises a side view and a perspective view of the second example. In this example a ball 805 is arranged to operate on surface 800 such as the surface of the rails. The ball 805 may comprise a core formed of, for example, steel, and an outer region of copper or aluminium. Optionally, to increase the lifetime of the ball 805 a hard wearing coating may be used around the copper or aluminium region. A two-dimensional linear motor 806 is provided to drive the ball in any/all of multiple directions to thereby provide an omnidirectional driving force.

Figure 8C:
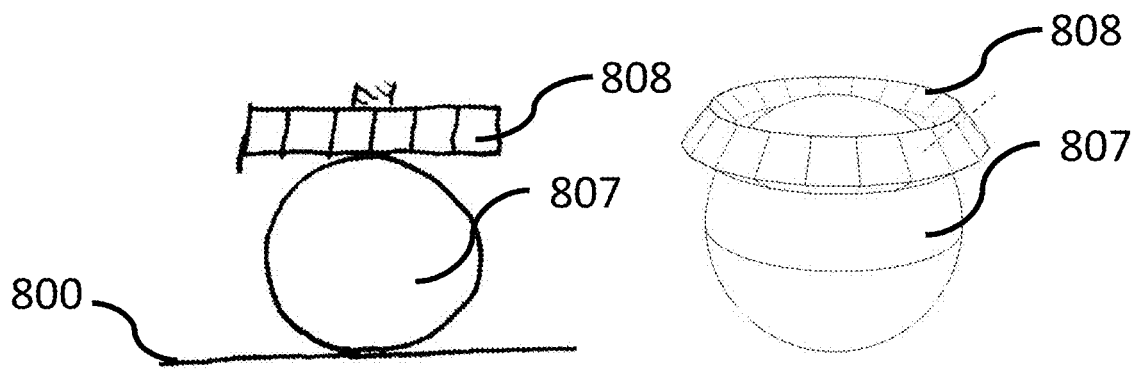

FIG. 8(c) shows a third example of implementing a ball 700 as the supporting unit 102. FIG. 8(c) comprises a side view and a perspective view of the third example. In this example a ball 807 is arranged to operate on surface 800 such as the surface of the rails. The ball 807 may be formed of a material such as aluminium or copper from which a frictionless bearing may be formed. To increase the lifetime of the ball 807 a hard wearing coating may be formed thereon. A spinning Halbach array 808 mounted to the chassis/body of the transporting device 100 may be used to induce a repulsive force in the ball 807 by way of the Lenz Effect to thereby keep the spinning Halbach array 808 and the ball separated to thereby provide the supporting unit 102. A dotted line indicates the axis of polarisation of one of the permanent magnets in the Halbach array. The nature of a Halbach array is that, in this case, alternate magnets may be polarised radially and tangentially to the ball, FIG. 8(c) shows just the radial ones.

FIGS. 8(d)i-8(d)iii show a fourth example of implementing a ball 700 as the omnidirectional driving unit 101 and/or the supporting unit 102. FIG. 8(d)i comprises a side view of the third example. FIG. 8(d)ii comprises a perspective view of a first variant of the fourth example and FIG. 8(d)iii comprises a perspective view of a second variant of the fourth example. In this example a ball 808 is arranged to operate on surface 800 such as the surface of the rails. The ball 808 may be formed of a highly conductive material such as aluminium or copper from which a frictionless bearing may be formed. To increase the lifetime of the ball 807 a hard wearing coating may be formed thereon. Spinning Halbach arrays 809 may be formed around the ball 808 to induce a repulsive force in the ball 808 by way of the Lenz Effect to thereby keep the spinning Halbach arrays 809 and the ball 808 separated to thereby provide the supporting unit 102. In both variants, effective magnetic fields are radial to both the Halbach arrays 809 (formed as rings and/or wheels) and the ball 808. The Halbach arrays 809 work in pairs, each being paired with the Halbach array 809 opposite. In the variant of FIG. 8(d)ii, the Halbach array 809 are arranged in a vertical plane as wheels which may be individually controlled. The wheels in one pair rotate about their axes in the same direction as each other, in order to generate both a lifting force and a turning force—thus generating drive. The other wheels may optionally be rotated about their axes in the opposite direction to each other in order to generate only lift. Alternatively, this second set of wheels may be rotated in the same direction as each other to generate both a lifting force and a steering force. In the variant of FIG. 8(d)iii, the wheels in one pair rotate in the opposite to each other as viewed from above (or in the same direction if viewed along a line that passes through the centre of both wheels) to generate both a lifting force and a turning force. The other wheels may optionally be rotated about their axes in the same direction to each other (as viewed from above) in order to generate both a lifting force and a steering force. Optionally, each spinning Halbach array 809 may comprise at least one driving coil 810 (shown in FIG. 8(d)iii, however, may equally be applied to FIG. 8(d)ii) arranged to generate a drive force acting in a direction, which may be omnidirectional, to thereby move the transporting device 100.

FIG. 9(a) shows a fifth example of implementing a ball 700 as the omnidirectional driving unit 101 and/or the supporting unit 102. In this example a ball 901 is arranged to operate on surface 900 such as the surface of the rails. The ball 901 is formed as a magnetic sphere, the surface of which is formed from alternating magnetic poles. An array of electromagnets 902 are mounted to the chassis/body of the transporting device 100 and dynamically drive the transporting device 100 by energising electromagnets 902 to thereby attract/repel the ball 901 causing the transporting device 100 to move. Moreover, the electromagnets 902 may be used to support the transporting device 100 at a predetermined distance from the rails of the grid 902 by energising the electromagnets 902 to levitate the transporting device 100 above the ball 901 and above the rails of the grid 200. Alternatively, the electromagnets 902 may be implemented as variable permanent magnets. For example, a cylindrical, yet hollow, permanent magnet may have a variable field implemented by extending or retracting a soft iron core in into the hollow centre of the magnet. At a distance from the variable magnet the magnet polarity may thereby be caused to change. Similarly, a solid permanent magnet may be held a variable distance from a soft iron core to thereby decrease/increase the magnet field strength at a distance from the magnet. Alternatively, a cylindrical magnet, polarised orthogonally to its axis, may be rotationally varied next to a soft iron core comprising a convex end. In this way the magnetic field strength at a distance from the magnet may be varied. Alternatively, four permanent magnets of alternating polarity may be arranged on a circular mounting next to a cone shaped soft iron core such that as the mounting rotates the magnetic field strength at a distance varies.

FIG. 9(b) shows a sixth example of implementing a ball 700 as the omnidirectional driving unit 101 and/or the supporting unit 102. In this example a ball 903 is arranged to operate on surface 900 such as the surface of the rails. The ball 903 may be rotationally supported by way of ball bearings 905 against a mount 904 arranged to be mounted to the chassis/body of the transporting device 100. In this way, the ball 903, together with the ball bearings 905, may provide a supporting force to transporting device 100. Optionally, the ball bearings 905 may be made of a magnetic material and the mount 904 may comprise a permanent magnet to hold the ball bearings in a location close to the mount 904 to thereby ensure easy rotation of the ball 903. Alternatively, frictionless bearings as described in previous examples may be used instead of ball bearings 905. To drive the ball 904 a drive wheel 906 may be provided in contact with the ball 903. Moreover, a second drive wheel provided on an orthogonal axis of the ball 903 thereby provides an omnidirectional driving unit 101 which is arranged to move the transporting device 100 in a direction.

Figure 10A:
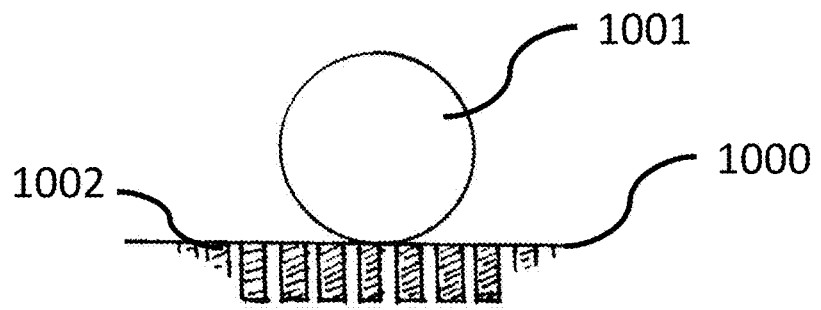
FIGS. 10(a)-10(d) show yet further examples of implementing the ball in the transporting device.

FIG. 10(a) shows a seventh example of implementing a ball 700 as the omnidirectional driving unit 101. In this example a ball 1001 is arranged to operate on surface 1000 such as the surface of the rails. In this example the ball may be formed of steel whilst the rail 1000 comprises at least one electromagnet 1002 arranged to attract the ball 1001. In this way, the ball 1001 may be arranged to drive the transporting device 100 by being attracted to the electromagnets 1002 so that as the balls moves the transporting device 100 moves as well. Advantageously, this example does not require the powering of the omnidirectional driving unit 101 because the power requirements are only present in the electromagnets 1002 present in the rail 1000.

Figure 10B:
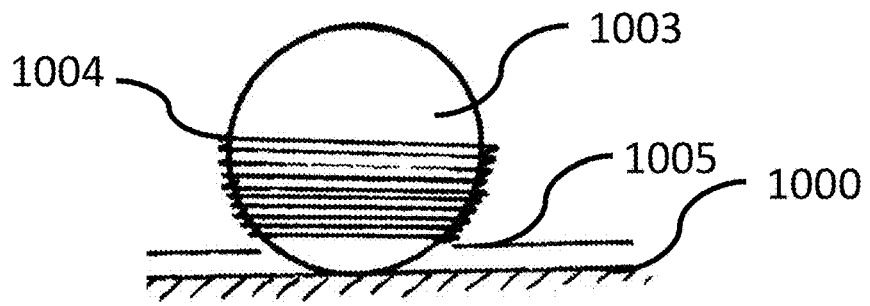

FIG. 10(b) shows an eighth example of implementing a ball 700 as the supporting unit 102. In this example a ball 1003 is arranged to operate on surface 1000 such as the surface of the rails. In this example the ball 1003 may be formed of steel whilst a coil 1004 is mounted to the body/chassis of the transporting device 100. Accordingly, energising the coil 1004 causes an attractive force between the coil 1004 and the ball 1003 thereby supporting the transporting device 100, shown as a payload 1005.

Figure 10C:
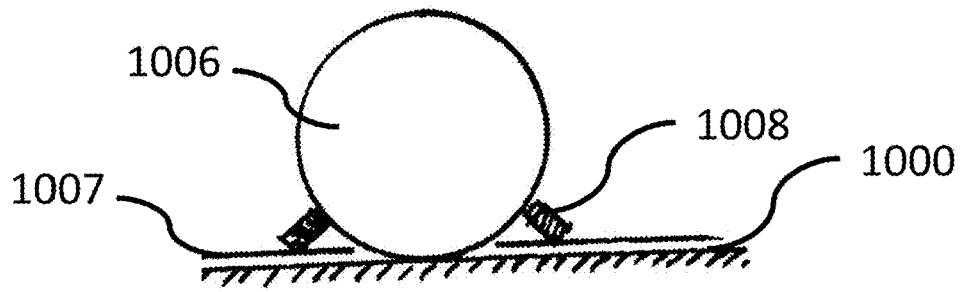
Figure 10D:
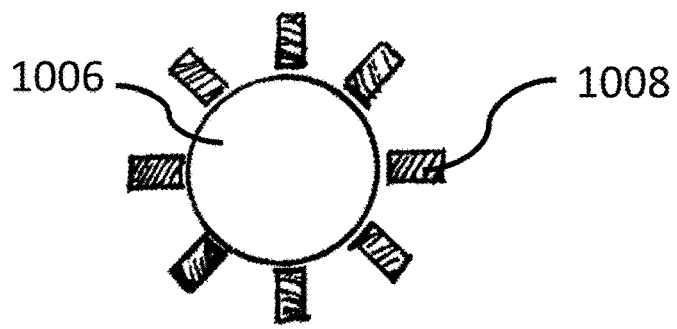

FIGS. 10(c) and 10(d) show a ninth example of implementing a ball 700 as the supporting unit 102. In this example a ball 1006 is arranged to operate on surface 1000 such as the surface of the rails. FIG. 10(c) shows a side view of the apparatus and FIG. 10(d) shows a plan view. In this example the ball 1006 may be formed of steel whilst electromagnets 1008 are mounted to the body/chassis of the transporting device 100, shown as a payload 1007. In this way, by energising the electromagnets 1008 the transporting device 100 is supported at a predetermined distance from the grid 200.

FIGS. 11(a)i and 11(a)iv show a tenth example of implementing a ball 700 as the supporting unit 102. In this example a ball 1101 is arranged to operate on surface 1100 such as the surface of the rails. FIGS. 11(*a*)i and 11(*a*)ii show a side view and a perspective view, respectively, of a first variant of the tenth example. As shown in FIGS. 11(*a*)i and 11(*a*)ii, a ball 1101 is provided comprising an outer ball and an inner ball. The inner ball comprises electromagnets 1102 attached thereto. Between the outer ball and the inner ball is provided ball bearings. In one example, the electromagnets 1102 are selectively energised to form an attraction to steel/ferritic elements 1103 positioned outside of the ball 1101. The steel elements 1103 may be mounted to the transporting device 100, shown as a payload 1104. In this way, by energising the electromagnets 1102 the transporting device 100 may be supported at a predetermined distance from the rail 1100. Therefore, this example relies on magnetic attraction to form a dynamic magnetic suspension. Alternatively, as shown in FIGS. 11(*a*)iii and 11(*a*)iv (which comprise a side view and a perspective view, respectively, of a second variant of the tenth example), the steel elements 1103 may be replaced with permanent magnets 1105. In this way, magnetic repulsion may be used to form the dynamic magnetic levitation.

FIGS. 11(*b*)i-11(*b*)iv show an eleventh example of implementing a ball 700 as the supporting unit 102. Similar to the tenth example a ball 1101 is arranged to operate on surface 1100 such as the surface of the rails. The ball 1101 is provided comprising an outer ball and an inner ball. However, different to the tenth example, the inner ball comprises at least one permanent magnet 1107 fixed thereto. Between the outer ball and the inner ball is provided ball bearings to allow the outer ball to rotate around the inner ball. In one example, as shown in FIGS. 11(*b*)i and 11(*b*)ii a side view and a perspective view, respectively, of a first variant of the eleventh example is shown. As shown in FIGS. 11(*b*)i and 11(*b*)ii, electromagnets 1108 are provided around the ball 1101. By energising the electromagnets 1108 the transporting device 100, which is shown as a payload 1104, may thereby be provided with a supporting force to cause the transporting device 100 to be placed a predetermined distance from the rail 1000. Alternatively, as shown in FIGS. 11(*b*)iii and 11(*b*)iv (which comprise a side view and a perspective view, respectively, of a second variant of the eleventh example), the electromagnets may be replaced by a permanent magnet 1109, which is envisaged to be a ring magnet, and balancing coils 1110. The permanent magnet 1109 and the balancing coils 1110 are envisaged to be fixed to the chassis/body of the transporting device 100. In this way, a supporting force may be generated by a repulsive force between the permanent magnets 1107 and 1109. Balance of the ball 1101 may be achieved by the balancing coils 1110. In this way, the transporting device 100 may be provided with a supporting force. Advantageously, in this example power need not be provided to the inner ball.

FIGS. 12(*a*) and 12(*b*) show a transporting device 100 according to a second example of the first embodiment of the present invention. In this second example of the first embodiment, the omnidirectional driving unit 101 is provided by way of omniwheels 1200.

As shown in FIG. 12(*a*), an omniwheel 1200 comprises a wheel hub 1201 which may be caused to rotate about an axis at the centre of the hub. Moreover, the omniwheel 1200 also comprises turning elements 1202 around the circumference of the hub 1201 which are perpendicular to the turning/driving direction of the hub 1201. The effect is that the wheel can be driven with full force, but will also slide laterally with great ease.

Optimally, the omniwheels 1200 are provided close to each corner of the transporting device 100 so as to drive the transporting device 100 omnidirectionally across the grid 200. As will be appreciated, the omniwheels 1200 may be placed in any location around the transporting device 100 that allows for omnidirectional movement. As shown in Figure, the omniwheels 1200 are shown placed on the grid 200 by way of channels in the rails of the grid. This advantageously permits the omniwheels to more easily travel along the rails without the necessity to steer the omniwheels on the rails. The omniwheels 1200 thereby provide a driving force to drive the transporting device 100 in a first direction or a second direction across the grid 200. However, the omniwheels 1200 must be shaped to ride inside the channel of the grid 200 and, when moving axially i.e. in a direction perpendicular to the direction of driving of the omniwheels 1200, so as not to interfere with any part of the rail.

Optionally, the supporting unit 102 may be provided by way of the omniwheels 1200 to keep the transporting device 100 at an operating distance from the grid. Therefore the omniwheels 1200 may be used to both support the transporting device 100 at an operating distance from the grid and to be driven to thereby move the transporting device 100 across the grid 200.

Figure 21:
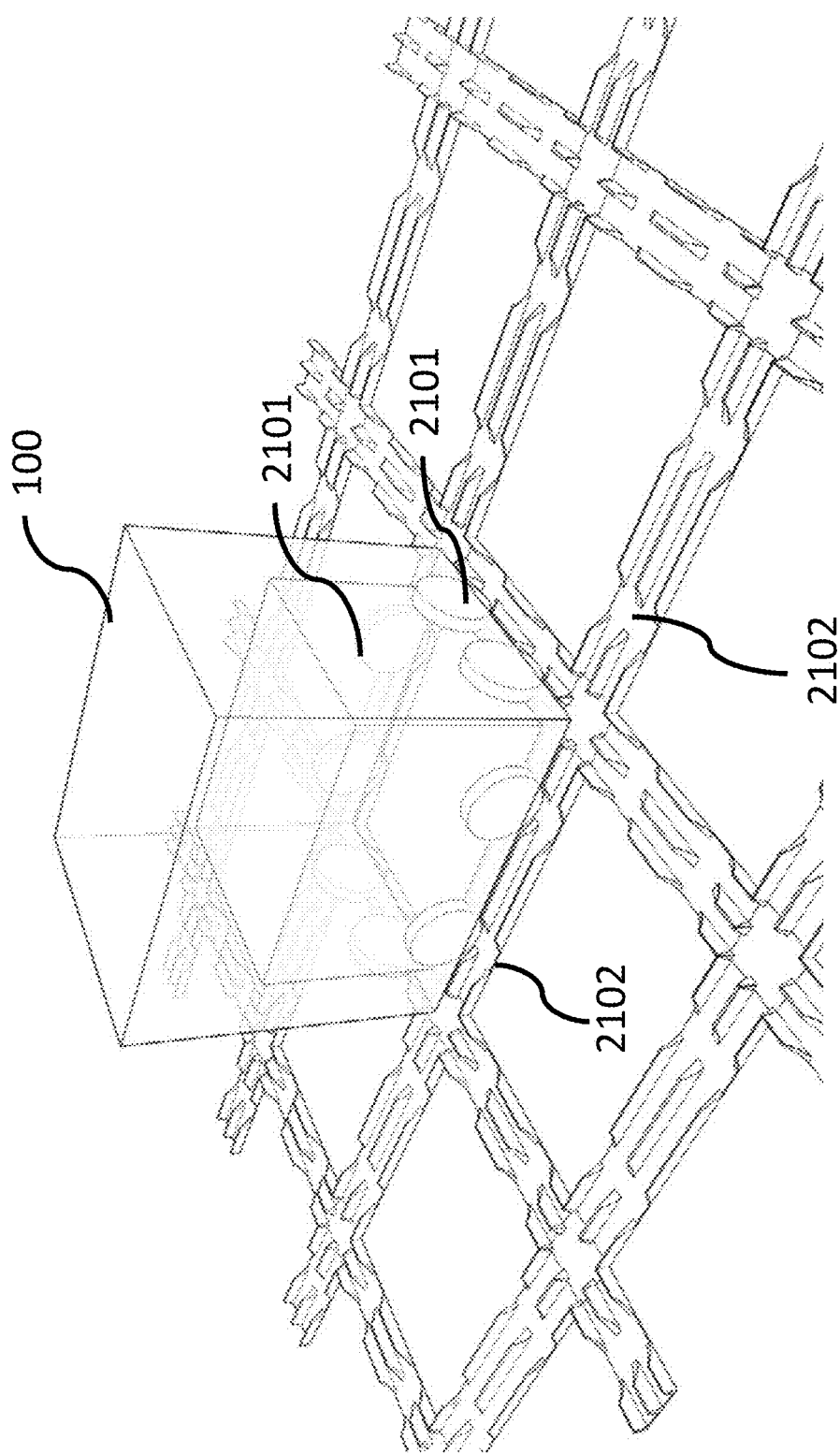
FIG. 21 shows a first example of a transporting device according to the second embodiment of the present invention.

As shown in FIG. 12(*b*), to permit onmidirectional movement, the omniwheels 1200 must be placed in a pattern on the transporting device 100 to allow omnidirectional movement. The example shown in FIG. 12(*b*) shows the omniwheels 1200 placed in a diagonal pattern, with opposing corners of transporting device 100 having the omniwheels 1200 aligned to be driven in a first direction, in other words having their respective axles aligned in a second direction. On the other hand, the omniwheels of the remaining two corners of the transporting device 100 are aligned to be driven in a second direction, in other words having their respective axles aligned in a first direction. Other configurations are possible. For example, each face of the transporting device 100 may comprise two omniwheels 1200 aligned in the same direction (for example, as shown in FIG. 21). This permits driving of the omniwheels 1200 on a first and second face of the transporting device 100 in a first direction whilst the omniwheels 1200 on a third and fourth face slide/move laterally and vice-versa. Alternatively, four omniwheels 1200 may be arranged on the transporting device 100 at each corner and angled, at, for example, 45 degrees to a face of the transporting device 100. In this way, all four wheels of the transporting device 100 drive the transporting device 100 causing movement by way of partial driving and partial side-ways movements.

FIGS. 13(*a*) to 13(*c*) show a transporting device 100 according to a third example of the first embodiment of the present invention. In this third example of the first embodiment, the omnidirectional driving unit 101 is provided by way of a steerable wheel 1300.

As shown in FIG. 13(*a*), a steerable wheel 1300 comprises a driving section 1301 and a steering section 1302. In this way, the wheel can be steered whilst being driven and may drive in any direction because an axis of a drive shaft passes through the centre of each wheel. Thereby, the drive shaft is coaxial with the steering axis.

The large cog at the top of the steering section 1320 may turn independently of the drive axle that passes through it (even though they are coaxial), but is fixed to the support section 1302 below it: when the small cog turns, the large cog, together with the whole steering section 1302 turns together, and with them, the wheel and drive components of the drive section 1301. Similarly, the wheel & cog at the bottom turn freely about the load-bearing axle that runs through them.

Optimally, steerable wheels 1300 are provided at each corner of the transporting device 100 so as to drive the transporting device 100 omnidirectionally across the grid 200, as shown in FIG. 13(*b*). As will be appreciated, the steerable wheels 1300 may be placed in any location around the transporting device 100 that allows for omnidirectional movement. As shown in FIG. 13(*b*), the steerable wheels 1300 are shown placed on the grid 200 by way of channels in the rails of the grid. This advantageously permits steerable wheels 1300 to more easily travel along the rails. The steerable wheels 1300 thereby provide a driving force to drive the transporting device 100 in a first direction or a second direction across the grid 200. However, the steerable wheels 1300 must be shaped to ride inside the channel of the grid 200 and, when moving, steered so as not to move axially.

A single motor could be used to drive all of the steerable wheels 1300 (with suitable drive shafts & gearing in between), and another motor, servo, linear motor or solenoid could be used to steer all 4 wheels, in unison, through 90 degrees. As described in the background section, a transporting device typically comprises 8 drive motors and 4 steering motors. Therefore the reduction to 1 of each motor suggests that drive failure would be reduced to ⅙ its current rate. Moreover, fewer active components makes the transporting device 100 lighter, cheaper, and more efficient, and reduces the number of spares needed, maintenance effort and down time.

Such a transporting device 100 could be steered in any direction, but the grid limits direction strictly to X & Y. However, in areas not constrained to these directions, such as maintenance areas transporting device 100 need not be aligned to a grid. Thereby, maintenance areas may be made easier to construct (i.e. simply a flat surface), manage, and less hazardous to work in (no holes in the floor/trip hazards).

Optionally, the supporting unit 102 may be provided by way of the steerable wheel 1300 to keep the transporting device 100 at an operating distance from the grid. Therefore the steerable wheel 1300 may be used to both support the transporting device 100 at an operating distance from the grid and to be driven to thereby move the transporting device 100 across the grid 200.

FIG. 13(*c*) shows another implementation of the steerable wheel 1300. In this example, the driving section 1301 is provided by way of a motor built into the hub of the wheel whereas the steering section 1302 is provided similar to that shown in FIG. 13(*a*). Advantageously, this simplifies the design and construction of the steerable wheel 1300.

With the steerable wheels shown in FIGS. 13(*a*) and 13(*c*) steering occurs about an axis that is orthogonal to the rail, intersecting the rail at the intersection of the centre lines of the rails in a first direction and second direction. However, each wheel must not project into the space above the adjacent rail, or it may interfere with the free travel of other transporting device 100 on that rail. This limits the wheel diameter.

However, the present inventors have found that if the steering axis of each steerable wheel was away from the wheel, further in to the transporting device 100, then the wheel could be located further back, and could travel in a small arc to steer allowing for a wider wheel diameter without widening the rail.

Figure 14:
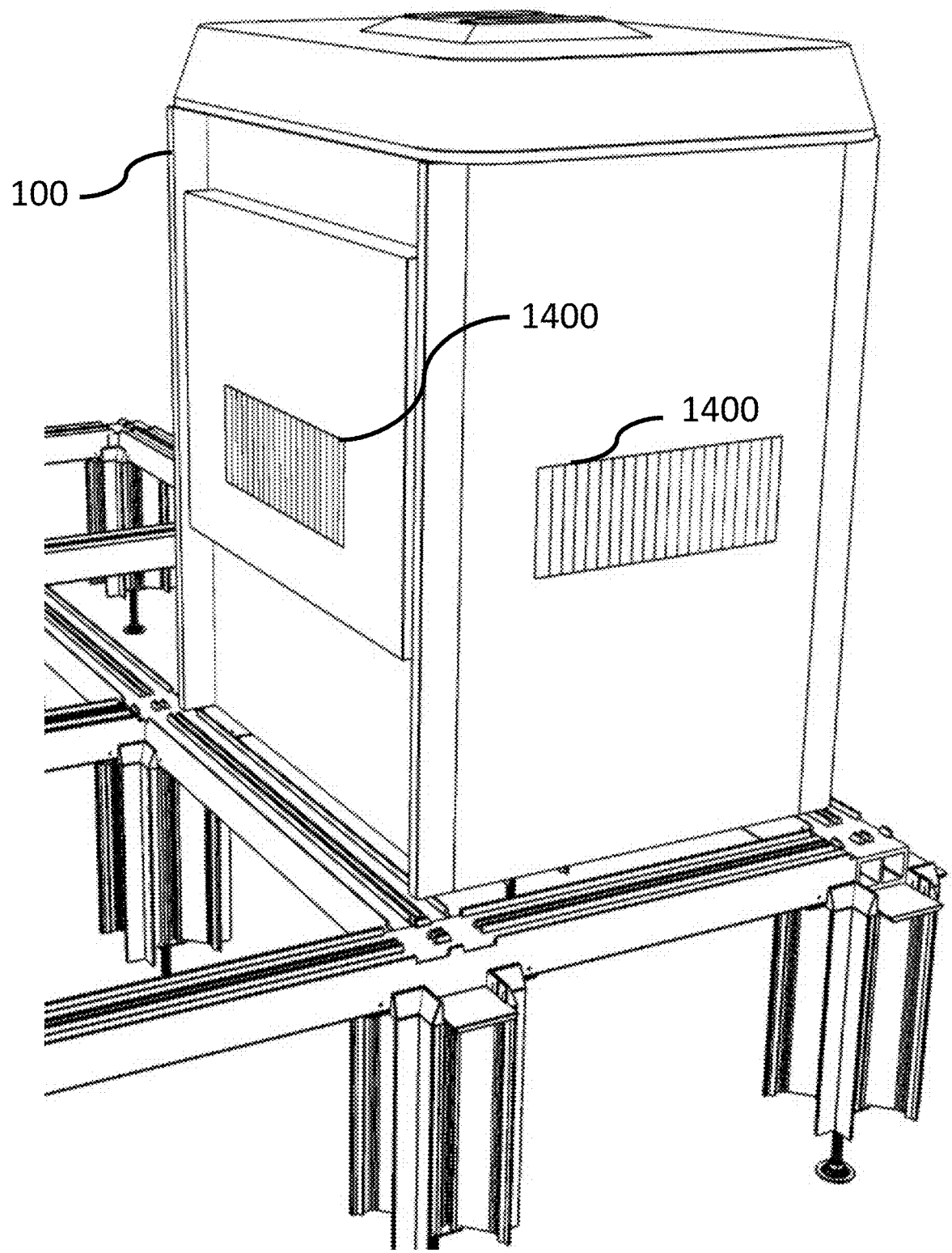
FIG. 14 shows a fourth example of the omnidirectional driving unit comprising an air jet generator.

FIG. 14 shows a transporting device 100 according to a fourth example of the first embodiment of the present invention. In this fourth example of the first embodiment, the omnidirectional driving unit 101 is provided by way of an air jet generator (not shown). The air jet generator may be incorporated into the body/chassis of the transporting device 100 and is arranged to generate jets of air which may selectively be expelled from the transporting device 100 by way of vents 1400 provided on orthogonal faces of the transporting device 100. In this way, the jets may be used to cause a force to act on the sides of the transporting device 100 causing it to drive in a particular direction. As will be appreciated, with vents 1400 on the sides of the transporting device 100 then no supporting force is being supplied to keep the transporting device 100 at a predetermined distance from the grid. Accordingly, a supporting unit 102 as described previously, using, for example, balls, omniwheels, steerable wheels etc. may be used.

Alternatively, the present inventors have found that a vent 1400 may be provided on the bottom of the transporting device 100 to provide a constant air jet to thereby support the transporting device 100 against the force of gravity.

The air jet generator may be realised in a number of ways. For example, a propeller operating inside the transporting device 100 may be arranged to cause the acceleration of air to be selectively vented from the vent 1400. Alternatively, a tank of compressed air (or other gas) may be used to vent the gas from the vents 1400 to thereby direct the transporting device 100.

Figure 15:
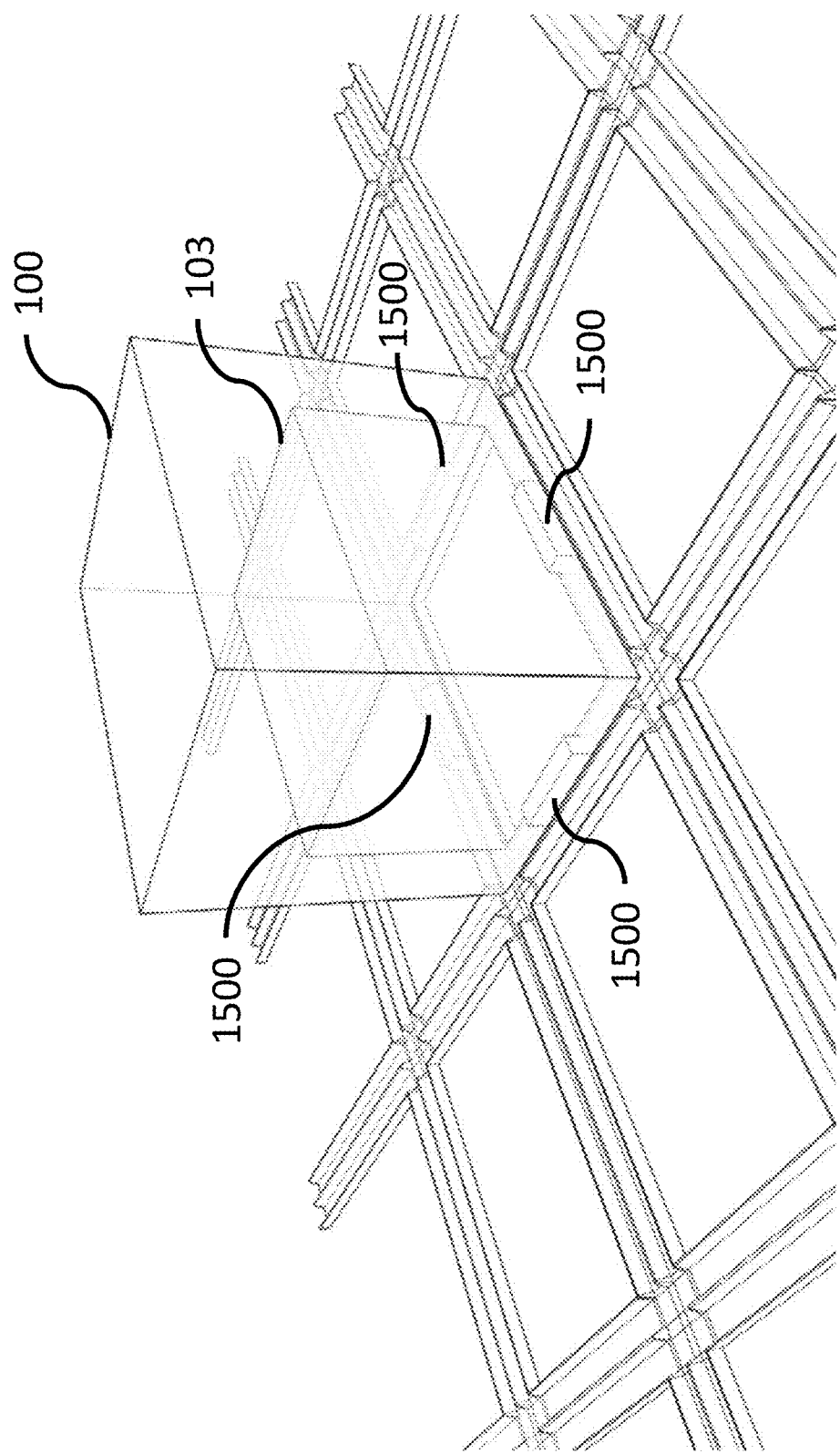
FIG. 15 shows a fifth example of the omnidirectional driving unit comprising a linear motor.

FIG. 15 shows a transporting device 100 according to a fifth example of the first embodiment of the present invention. In this fifth example of the first embodiment, the omnidirectional driving unit 101 is provided by way of linear motors 1500 arranged on perpendicular faces. The linear motors 1500 may be incorporated into the body/chassis of the transporting device 100 and arranged to cause a force to act on the transporting device 100 to thereby cause movement. To achieve this, rails with a high electrical conductivity, such as copper or aluminium, may be backed by steel, to complete the magnetic circuit. In this way, the linear motors 1500 in a first direction may cause movement in that same direction whilst linear motors 1500 in a second direction, perpendicular to the first direction may cause movement in the second direction. Although FIG. 15 shows linear motors on the sides of the transporting device 100, it will be appreciated that linear motors may instead be mounted at the corners of the transporting device 100. Thereby, this example provides a linear induction motor, with linear motors 1500 mounted within the transporting device 100 and a reaction plate (aluminium with a steel backing) mounted as rails.

As will be appreciated, the linear motors are unable to supply a supporting force to keep the transporting device 100 at a predetermined distance from the grid. Accordingly, a supporting unit 102 as described previously, using, for example, balls, omniwheels, steerable wheels etc. may be used.

Moreover, the rail shown in FIG. 15 includes a channel which is not necessary for a transporting device 100 comprising linear motors. Therefore, the rail may instead be formed of a flat material containing aluminium or copper. This also permits the linear motors to be in close proximity to the rails which maximises the driving force achieved by the linear motors. Alternatively, the rail may be formed to provide areas (named 'notched areas') in which the linear motors can be moved without interfering with the channel when moving against their direction of driving force.

However, when, for example, omniwheels are used as the supporting unit 102 it may be advantageous to form the rails with a channel. However, this may result in the linear motors being spaced apart from the rail which decreases the driving force of the linear motors. Accordingly, the present inventors have considered a lifting unit which may be employed to raise and lower the linear motors 1500 when moving in certain directions. For example, for a transporting device 100 moving in a first direction, the linear motors are arranged to generate the force in the first direction may be lowered close to the rail whilst the linear motors 1500 arranged to generate a force in the second direction may be raised to be clear of the channel. Similarly, when direction change occurs, the linear motors for the first direction may be raised whilst the linear motors for the second direction may be lowered. Alternatively, the channel may comprise notches to allow the free movement of the linear motors in close proximity to the rail.

Figure 16:
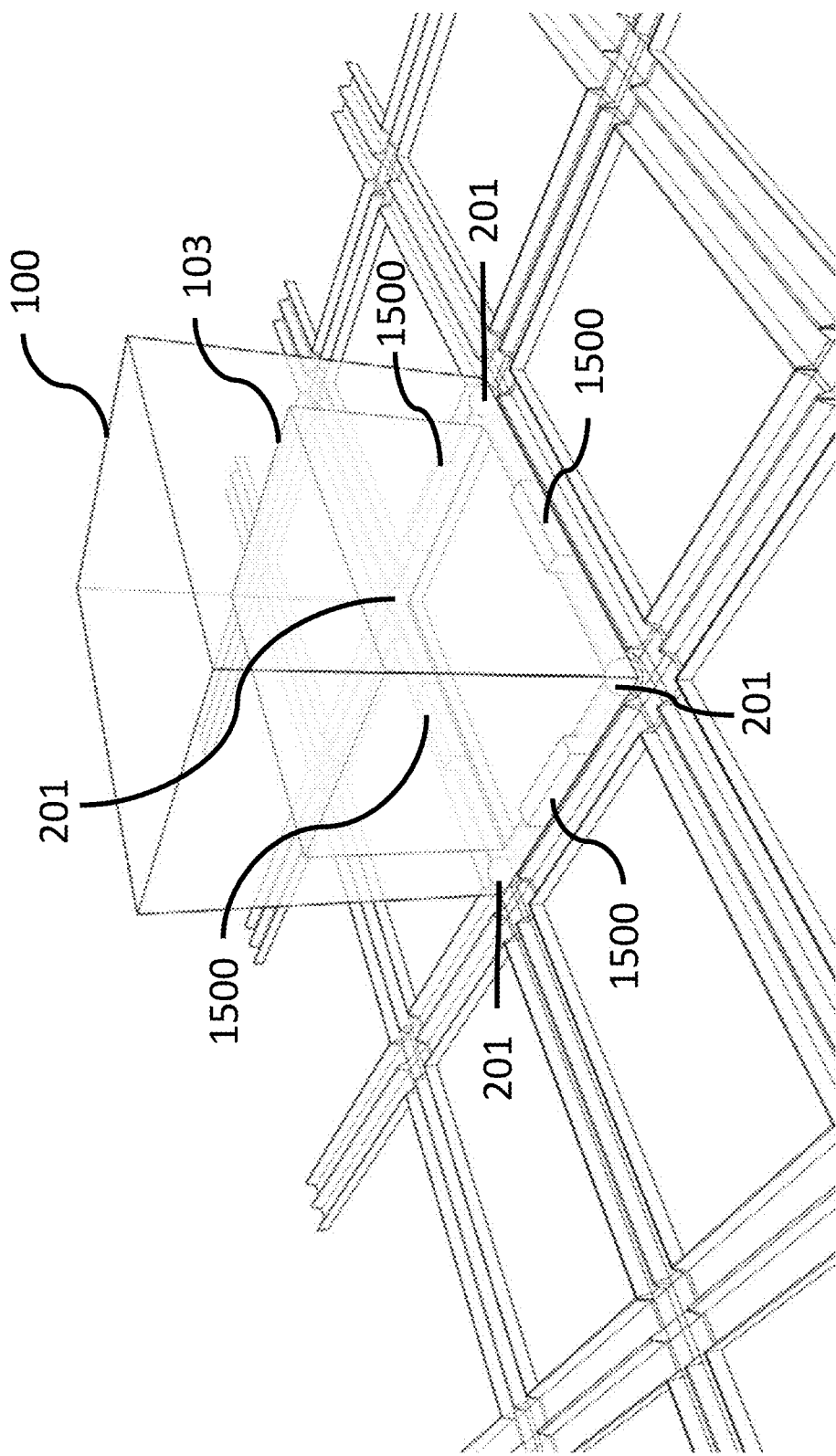
FIG. 16 shows an example of a transporting device comprising an omnidirectional driving unit comprising at least one linear motor and a supporting unit comprising at least one ball.

FIG. 16 shows an example of the linear motors 1500 being used together with balls 201. In this example, the omnidirectional driving unit 101 comprises the linear motors 1500 whilst the supporting unit 102 comprises the balls 201. As can be seen, the balls 201 run in the channels of the rails, therefore it is advantageous to raise/lower the linear motors 1500 where appropriate as previously described. The linear motors 1500 are arranged to move the transporting device 100 in a first direction or a second direction and the balls 201 provide a supporting force to keep the transporting device 100 an appropriate distance from the rails.

Figure 17:
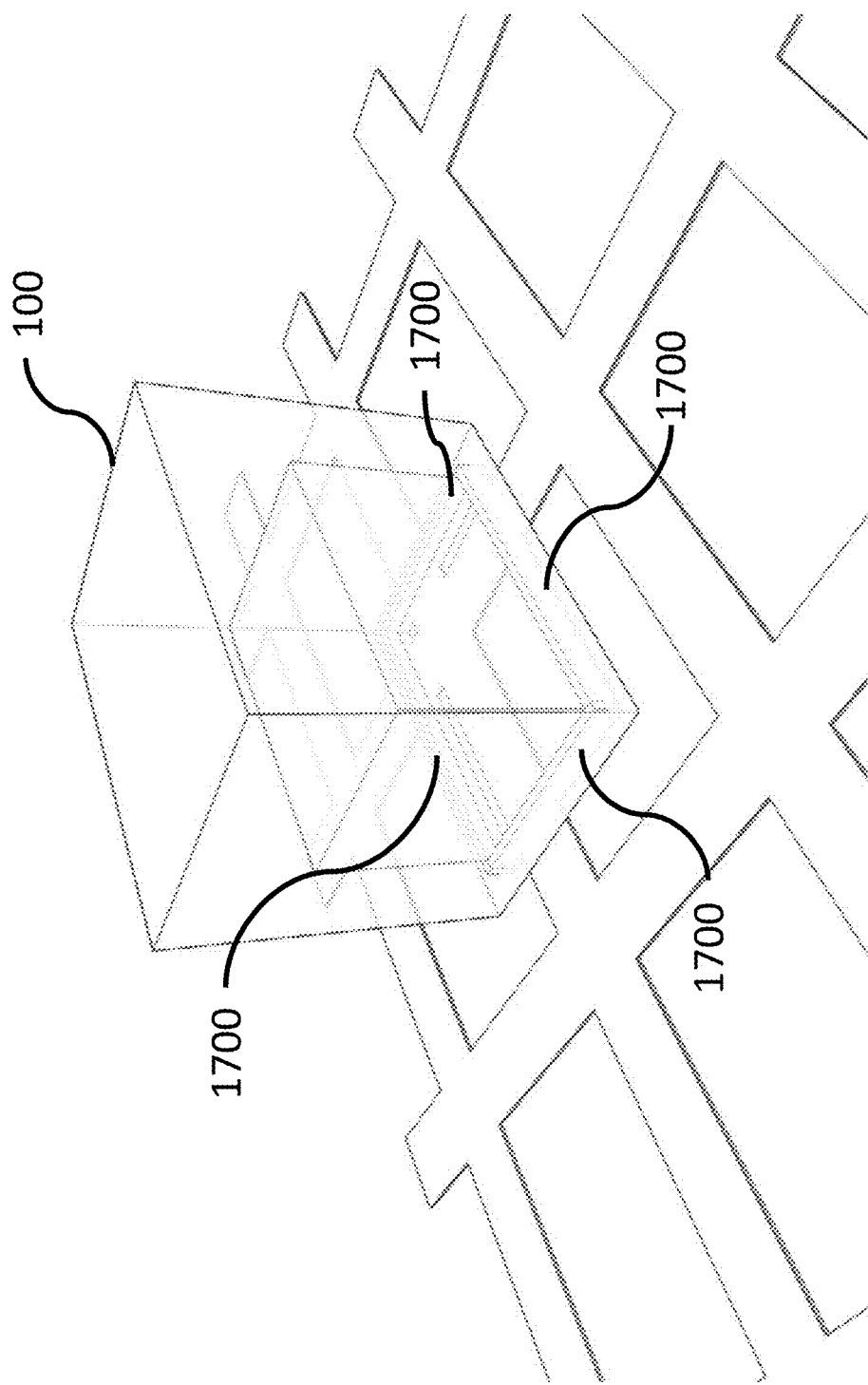
FIG. 17 shows the fifth example of the omnidirectional driving unit comprising at least one linear motor, where the at least one linear motor is designed to operate on a flat rail.

FIG. 17 shows an example where the linear motors 1700 have been extended to the entire perimeter of the transporting device 100. When used in conjunction with the flat rail shown in FIG. 17 allows the transporting device 100 to move in a direction that is not purely a first direction or a second direction but a combination of the first and second directions. In other words, the transporting device 100 may be arranged to move in a diagonal direction across the rails. Because the linear motors 1700 extend the entire perimeter of the transporting device 100 then there is no position on the rails from which the linear motor could not move the transporting device 100 because at least a part of the linear motor is always in close proximity to a part of the rails. However, FIG. 17 does not show a supporting unit 102 arranged to provide a supporting force on transporting device 100.

Figure 18:
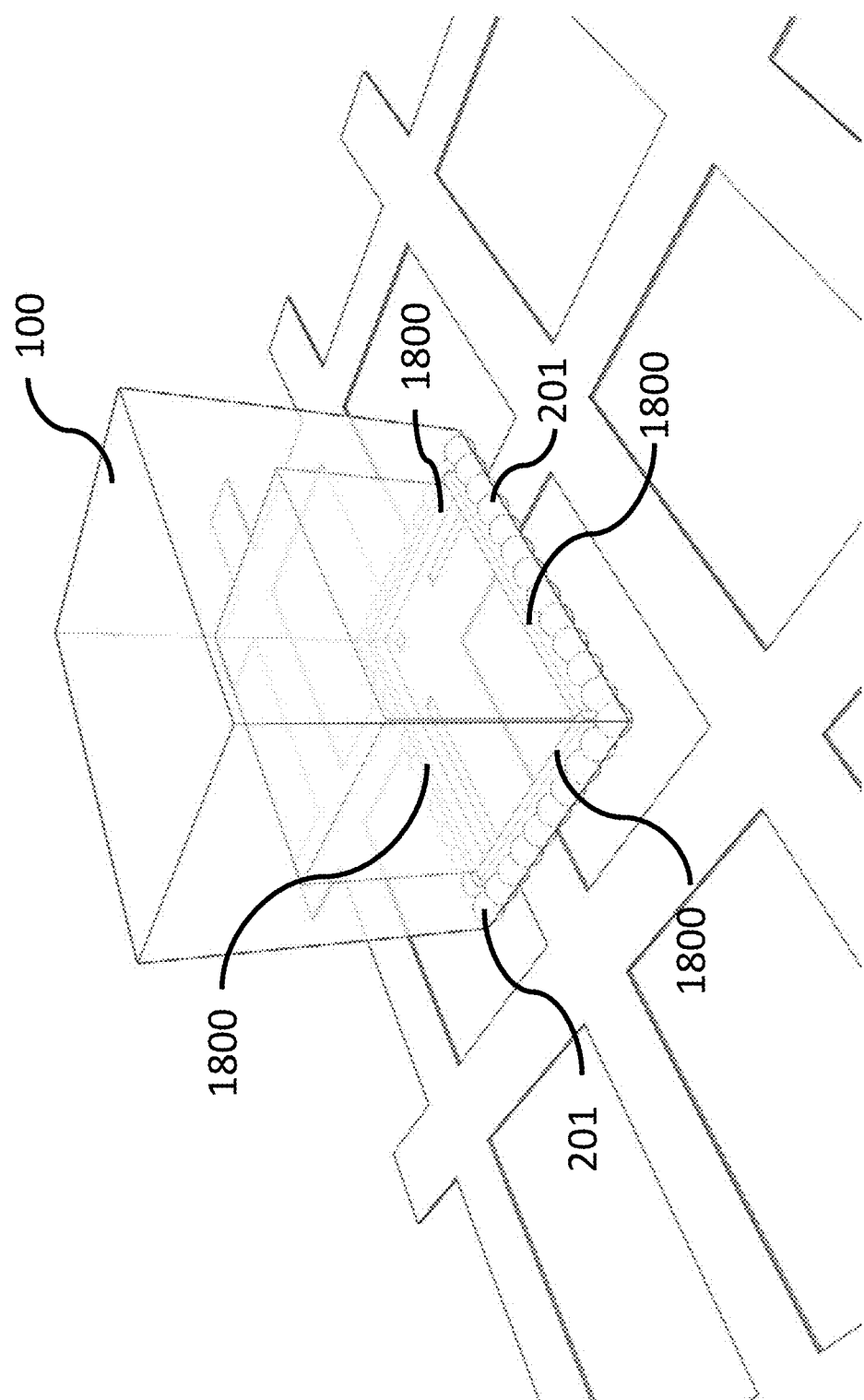
FIG. 18 shows an example of a transporting device comprising an omnidirectional driving unit comprising linear motors and a supporting unit comprising balls designed to operate on a flat rail.

FIG. 18 shows an example similar to FIG. 17, however, the supporting unit 102 is now provided by way of balls 201 around the perimeter of the transporting device 100. In this way, the shown transporting device 100 may operate on a flat rail because at least one ball 201 is in contact with at least a part of a rail when the transporting device 100 is moving diagonally such that the transporting device 100 is always being provided with an appropriate support force.

Figure 19:
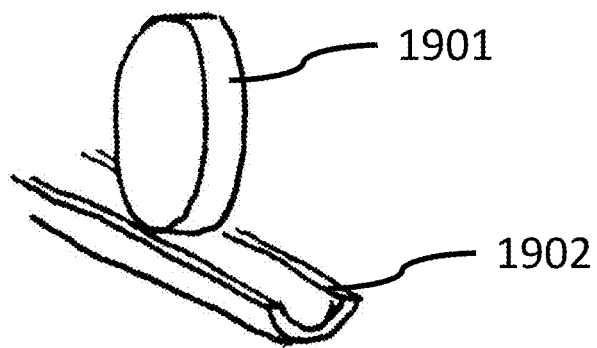
FIG. 19 shows a sixth example of the omnidirectional driving unit comprising a magnetic flotation generator.

FIG. 19 shows a transporting device 100 according to a sixth example of the first embodiment of the present invention. In this sixth example of the first embodiment, the omnidirectional driving unit 101 is provided by way of at least one Lenz wheel 1901 arranged on, for example, a corner of the transporting device 100. The Lenz wheel 1901 may be incorporated into the body/chassis of the transporting device 100 and is arranged to cause a force to act on the transporting device 100 to thereby cause movement. The Lenz wheel may comprise a spinning Halbach array which spins in a rail formed of copper half-pipe 1902 and which causes the spinning Halbach array to levitate and centre itself in the half-pipe. By tilting the Halbach array and/or reducing the speed of some Halbach arrays relative to other Halbach arrays then a differential driving force can be induced on the transporting device 100. In this way the transporting device 100 may be moved by way of a driving force generated by the Lenz wheel 1901.

Moreover, the supporting unit 102 may be formed by way of a spinning Halbach array in the copper half-pipe to thereby generate a supporting force on the transporting device 100 to ensure the transporting device 100 maintains an appropriate distance from the rail.

In this way, a magnetic levitation apparatus is used for the omnidirectional driving unit 101 and/or the supporting unit 102.

Similarly, the transporting device 100 may be provided with electromagnets in the base thereof. When the electromagnets in the base of the transporting device 100 are energised and used with a magnetic rail then the transporting device 100 may levitate over the rail with amount of energisation in each coil being used to provide a supporting unit 102 to the transporting device 100 and ensure it maintains an appropriate distance from the rail. Similarly, by selectively energising electromagnets then a driving force may be caused to act on the transporting device 100 so as to move the transporting device 100 in a first and/or second direction based on the action of the electromagnets on the magnetic rail. Alternatively, the electromagnets may be placed in the rail and the base of transporting device 100 made magnetic so that control of a supporting force and/or a driving force may be caused to act on the transporting device 100 by way of the electromagnets in the rail. In this way, the power requirements of the transporting device 100 may be reduced.

Figure 20:
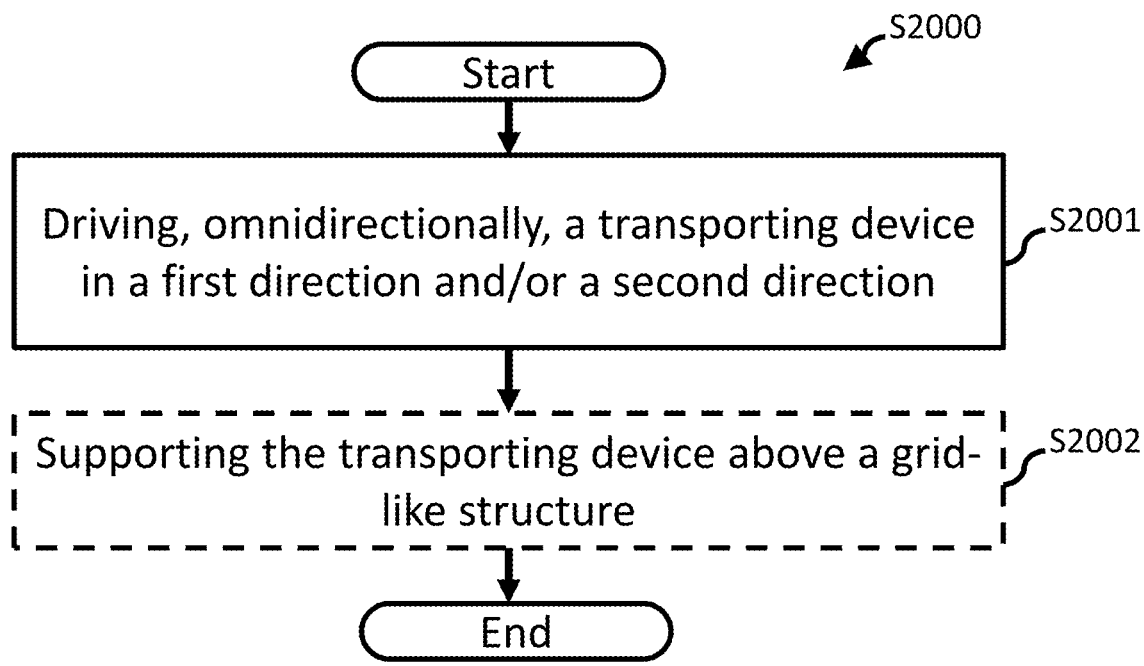
FIG. 20 shows a method according to the first embodiment.

FIG. 20 shows a method S2000 according to the first embodiment of the present invention.

At step S2001 the method drives, omnidirectionally, a transporting device in a first direction and/or a second direction. In this way, movement across rails arranged in a grid can be easily achieved without the necessity to move one set of wheels vertically which is slow thereby reducing transporting device 100 efficiency. As previously described, a number of different means by which the transporting device 100 may be driven have been described. In each case, the direction in which the transporting device 100 may be moved may be easily achieved without a "direction change operation".

At step S2002, optionally, a supporting force is provided to support the transporting device above the grid. In this way, the distance between the transporting device 100 and the grid can be optimally configured to permit both efficient movement of the transporting device 100 and optimal retrieval/deposition of a container on the stacks of containers.

Second Embodiment

Figure 22:
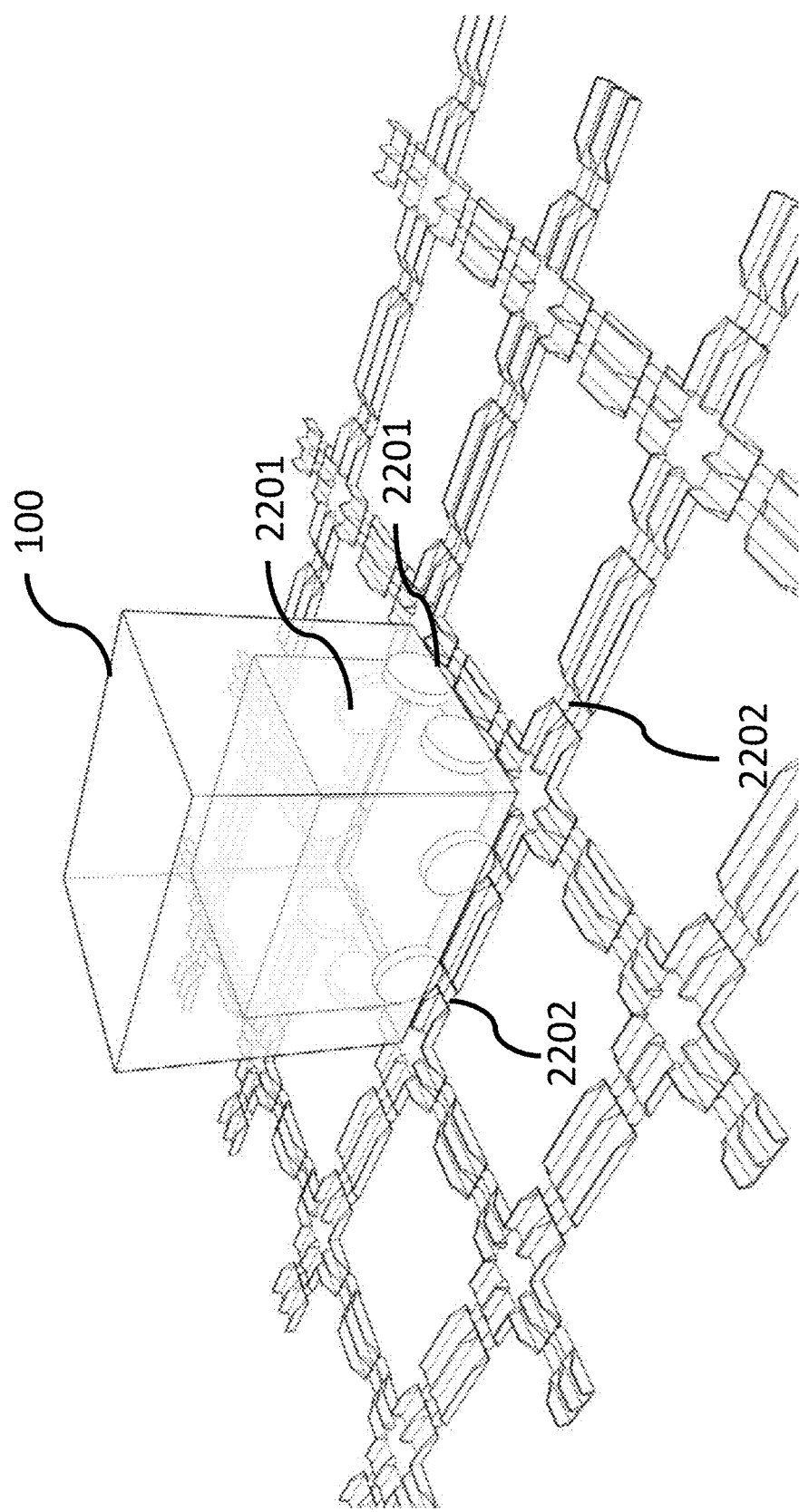
FIG. 22 shows a second example of a transporting device according to the second embodiment of the present invention.

A second embodiment of the present invention is shown in FIGS. 21 and 22. The second embodiment of the present invention is similar to the first embodiment except that modifications to the rail are made at selective points to permit the sliding of wheels mounted on the faces of the transporting device 100.

FIG. 21 shows a first example of the second embodiment of the present invention. In the first example, wheels 2101 similar to those used in existing designs of the transporting device 100 may be used. Moreover, the rails are modified with a flat region 2102 at a slight different level to the rest of the rail (for example, dropped by 1 mm compared to the rest of the rail). Moreover the flat region 2102 of the rail does not feature the channel of the rest of the rail instead the rail comprises 'notches' in the side of the channel of the rail.

Moreover, the flat region is positioned such that when the transporting device 100 is located over a cell of the grid 200 to retrieve/deposit a container then the wheels 2101 and the flat region 2102 are coaxial, i.e. lined up with one another. In this way, the wheels 2101 are able to slide/move in a direction of the axle across grid cells, which would otherwise be constrained by the channel of the rails. In this regard, the direction of movement is perpendicular to the 'normal' movement direction of the wheels when driven, i.e. perpendicular to the direction of driving of the omniwheels 1200.

Therefore, when wheels 2102 to move the transporting device 100 in a first direction are engaged, the wheels mounted to the transporting device 100 in the second direction are able to slide across the grid cell in the first direction and vice-versa.

Alternatively, the present inventors have found, advantageously, to provide each wheel 2101 with a diameter adjusting unit. Therefore, the rail with a lowered surface flat regions 2102 need not be provided lower than the surface of the rest of rail—the rail may be flat across its length. In particular, because each wheel is typically the same diameter, then causing a wheel to slide/move axially causes wear on a tyre of the wheel 2101, even with the lowered surface flat regions 2102. Therefore, the present inventors found that reducing the diameter of the wheels 2101 which are moving axially can reduce this wear because the tyre is then not in contact with the rail. For example, when the wheels 2102 to move the transporting device 100 in a first direction are engaged, the wheels mounted to the transporting device 100 in the second direction are reduced in diameter and then able to slide across the grid cell in the first direction and vice-versa.

To achieve this the present inventors found that reducing the amount of gas inflating the tyre of the wheel 2102 was an effective way to reduce the diameter of the wheel 2101. Moreover, the tyre may be inflated when movements in the complimentary direction is required. Alternatively, the present inventors have found that a magnetic means to contract the tyre was also effective. To achieve this, the tyre is implanted with a permanent magnetic pole on an inner surface of the tyre and the hub of the wheel include the same pole next to an opposing magnetic pole which is able to be rotated. Accordingly, when the tyre is to be contracted, the hub of the wheel is rotated to align opposing poles to thereby cause the tyre surface and the hub to be attracted thereby contracting the wheel diameter. Correspondingly, to expand the tyre, the hub is turned again so that alike magnetic poles are aligned to thereby repel the tyre from the hub resulting in an expansion of the tyre. Alternatively, the tyre surface may be mechanically manipulated by way of a spring, piston, electro-active material or the like to adjust the diameter of the wheel.

Alternatively, the wheels 2101 may be implemented as omniwheels, for example as shown in FIG. 12(*a*) which allow movements in an axial direction. In this regard, the 'axial direction' is the direction in which the axles of the omniwheels extend which is perpendicular to the direction in which the omniwheel moves when driven. However, because the omniwheels are arranged to move axially (by way of turning elements) without the need for diameter adjustment then the flat regions 2102 need not be provided lower than the surface of the rest of rail and no diameter adjusting unit need be provided. In this sense, the rails are flat with a channel formed along a portion of the rail which means that the wheels 2102 need not be steered. As can be seen in FIG. 21, at locations where the wheels are to move axially the sides of the channel of the rail is removed/not installed to permit wheels 2101 which are to move axially to do so. Therefore, when the transporting device 100 is aligned with a cell to deposit/retrieve a container then the sides of the channels at those locations is not installed. In this way, when wheels are engaged to move in a first direction then the wheels on perpendicular sides can move in a second direction across the rails.

FIG. 22 shows a second example of the second embodiment of the present invention. In the second example, wheels 2201 similar to those used in existing designs of the transporting device 100 may be used. Similar to the first example of the second embodiment, the rails comprise 'notches' to permit wheels not presently being driven to move perpendicular to their driving direction i.e. in the direction in which their axles extend. Moreover, the rails are modified to comprise a roller 2202. The roller 2202 is arrange to rotate about an axle which is arranged in the direction in which the rail extends. For example, if the rail extends in a first direction then the axis of rotation of the roller is also aligned with the first direction so that the roller rotates in a second direction. In this way, when the transporting device 100 is located in a position to retrieve/deposit a container then the wheel may move in a direction perpendicular to its turning/driving direction to thereby move laterally across the grid 200. The surface of the roller 2202 may be arranged to be parallel to a top surface of the grid 200 so that movement across the grid is not impeded by an uneven surface. By utilising a roller 2202 the present invention have found that the surface of a tyre of the wheel 2201 is not unnecessarily worn away by a sliding motion required to move omnidirectionally. Instead, the rollers 2202 permit an easier traversal of the grid for the wheels 2201 when moving in a direction perpendicular to their 'usual motion' i.e. perpendicular to a wheel's 2201 driving direction.

Figure 23:
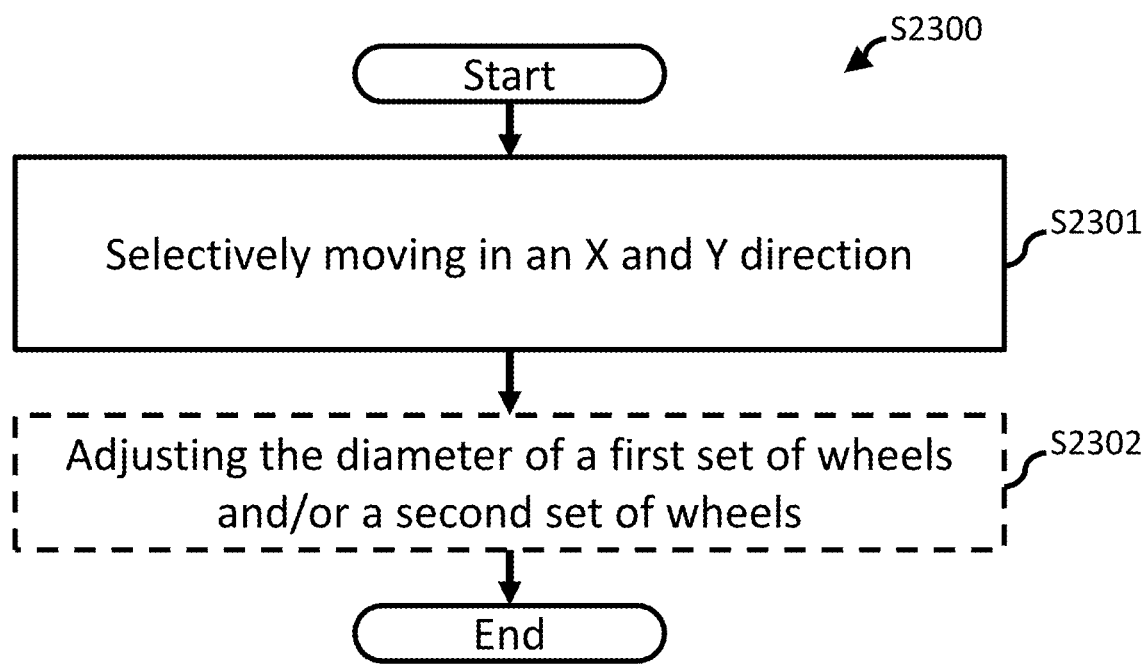
FIG. 23 shows a method according to the second embodiment.

FIG. 23 shows a method S2300 according to the second embodiment of the present invention.

The method comprises a step S2301 which selectively moves, omnidirectionally, a transporting device in a first direction and a second direction. In this way, movement across rails arranged in a grid can be easily achieved without the necessity to move one set of wheels vertically which is slow thereby reducing transporting device 100 efficiency. As previously described, a number of different means by which the transporting device 100 may be driven have been described. In each case, the direction in which the transporting device 100 may be moved may be easily achieved without a "direction change operation".

Step S2302, optionally, may adjust the diameter of a first set of wheels and/or a second set of wheels so that the wheel does not interfere with the surface of the grid when the wheel is being moved axially/not being driven. In this way, excessive wear of the wheel can be avoided.

Modifications and Variations

Throughout the description a transporting device 100 has been shown occupying a single space of the grid 200. However, a transporting device 100 may be formed of any size so as to cover any integer number of cells across the grid. For example, a transporting device 100 may be formed to cover 2 cells in a first direction and 1 cell in a second direction. Alternatively, 2 cells in a first direction and 3 cells in a second direction. In this way, a transporting device 100 may be arranged to retrieve/deposit more than one container across the grid 200 at any one time. Similarly, the transporting device 100 may be formed to contain more than one container in a third direction such as to store a stack of containers within the body/chassis of the transporting device 100.

With regard to a transporting device 100 according to a fifth example, as shown in any of FIGS. 15 to 18, further modifications to this example are envisaged. For example, the fifth example was previously described using linear induction motors, driving coils for which are mounted in the transporting device 100 with a corresponding reaction plate being formed in the rails (formed, for example, from aluminium backed by steel). However, it is envisaged that such an arranged may be reversed, with the reaction plate formed in the transporting device 100 comprising steel to complete a magnetic circuit with a linear motor (comprising driving coils) formed in the rail. In this example, the linear motors mounted in the rail are driven with appropriate currents and voltages to induce an opposing voltage in the reaction plate in the transporting device 100. Such induced currents and voltages may be used to levitate the transporting device 100 and/or cause movement of the transporting device 100 in a particular direction.

Alternatively, it is envisaged that linear synchronous motors may be used instead of linear induction motors shown in FIGS. 15 to 18. In this modification, driving coils are mounted in a transporting device 100 with corresponding permanent magnets mounted in the rail. In this way, the combination of transporting device and rail is envisaged to be a linear synchronous motor. The driving coil in the transporting device is driven with appropriate voltages and currents to cause the setting up of a magnetic field which opposes the magnetic field of the permanent magnets in the rail. Therefore, the transporting device 100 may be levitated and/or moved by selective application of voltages and currents.

Similarly, in this modification, the linear synchronous motor may be formed by mounting permanent magnets in the transporting device 100 with driving coils mounted in the rail. In this way, levitation and/or motion of the transporting device 100 may be achieved by driving the coils with appropriate voltages and currents so cause the generation of a magnetic field around the rail which is repelled by the magnetic field of the permanent magnets in the transporting device 100.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A transporting device configured to transport a container stored in a facility which has a plurality of stacks and a plurality of pathways arranged in cells so as to form a grid-like structure above the stacks, wherein the grid-like structure extends in a first direction and in a second direction, the transporting device being configured to operate on the grid-like structure, the transporting device comprising:
    a vehicle body configured to accommodate one or more containers;
    an omnidirectional driving unit configured to drive the transporting device in a first direction and in a second direction of a grid-like structure, the omnidirectional driving unit having plural driving components, each of the plural driving components configured to apply a driving force to the grid-like structure and move the transporting device in the first direction and the second direction; and
    a supporting unit arranged to support the transporting device at an operating distance from the grid, the supporting unit configured to apply a force to the transporting device that counteracts the force of gravity acting on the vehicle body of the transporting device.

2. The transporting device according to claim 1, wherein the plurality of driving components of the omnidirectional driving unit comprises at least one or more of:
    a substantially ball-shaped rolling means;
    a wheel having turning elements arranged perpendicular to a turning direction of the wheel;
    a steerable wheel;
    a gas jet generator;
    a linear motor; and
    a magnetic levitation generator.

3. The transporting device according to claim 1, wherein the supporting unit comprises at least one or more of:
    a substantially ball-shaped rolling means;
    a wheel having turning elements arranged perpendicular to a turning direction of the wheel;
    a steerable wheel;
    a gas flotation generator; and
    a magnetic levitation generator.

4. The transporting device according to claim 1, wherein the omnidirectional driving unit and the supporting unit are integrally formed.

5. The transporting device according to claim 3, comprising:
    the substantially ball-shaped rolling means, configured and arranged to move in a channel formed on the grid-like structure.

6. The transporting device according to claim 5, wherein the substantially ball-shaped rolling means is arranged on a corner of the transporting device.

7. The transporting device according to claim 3, wherein the steerable wheel of the omnidirectional driving unit is arranged on a corner of the transporting device.

8. The transporting device according to claim 2, comprising:
    the linear motor, the linear motor having a lifting unit configured and arranged to raise and lower the linear motor towards and away from a grid-like structure.

9. The transporting device according to claim 1, wherein the omnidirectional driving unit comprises:
    a linear motor, and the supporting unit includes a substantially ball-shaped rolling means.

10. The transporting device according to claim 1, wherein the omnidirectional driving unit comprises:
    a linear motor arranged around a bottom face of the transporting device.

11. The transporting device according to claim 1, wherein the omnidirectional driving unit comprises:
    a linear motor arranged around a bottom face of the transporting device, and the supporting unit includes a substantially ball-shaped rolling means arranged around the bottom face of the transporting device.

12. A storage system comprising:
    a first set of parallel rails or tracks extending in an X-direction, and a second set of parallel rails or tracks extending in a Y-direction transverse to the first set in a substantially horizontal plane to form a grid pattern having a plurality of grid spaces;
    a plurality of stacks of containers located beneath the rails, and arranged such that each stack is located within a footprint of a single grid space; and at least one transporting device according to claim 1, the at least one transporting device being configured and arranged to move in the X and Y directions, above the stacks.

13. The storage system according to claim 12, wherein the at least one transporting device has a footprint that occupies only a single grid space in the storage system, such that a transporting device occupying one grid space will not obstruct a transporting device occupying or traversing adjacent grid spaces in the X and Y directions.

14. A method of controlling a transporting device arranged to transport a container stored in a facility, the facility having a plurality of stacks which can store the container, the facility including a plurality of pathways arranged in cells so as to form a grid-like structure above the stacks, wherein the grid-like structure extends in a first direction and in a second direction, the transporting device having an omnidirectional driving unit and a supporting unit and is configured and arranged to operate on the grid-like structure, the method comprising:
  driving, by the omnidirectional driving unit, plural driving components of the transporting device to apply a driving force to the grid-like structure to move the transporting device in the first direction and the second direction;
  supporting, by the supporting unit, the transporting device at an operating distance from the grid; and
  applying, by the supporting unit, a force to the transporting device that counteracts the force of gravity acting on a vehicle body of the transporting device.

15. The storage system according to claim 12, wherein the at least one transporting device has a footprint that occupies only a single grid space in the storage system, such that a transporting device occupying one grid space will not obstruct a transporting device occupying or traversing adjacent grid spaces in the X and Y directions.

16. The storage system according to claim 14, wherein when the first set of wheels is to be driven, the diameter adjusting unit is configured and arranged to reduce the diameter of the second set of wheels, and when the second set of wheels is to be driven, the diameter adjusting unit is configured and arranged to reduce the diameter of the first set of wheels.

17. The storage system according to claim 16, wherein diameter adjusting unit is configured and arranged to adjust wheel diameter by at least one of:
  increasing/reducing an amount of a gas in the first set of wheels and/or the second set of wheels;
  magnetically expanding/contracting a tire surface of the first set of wheels and/or the second set of wheels;
  electro-mechanically adjusting a tire surface of the first set of wheels and/or second set of wheels; and
  mechanical adjustment of a tire surface of the first set of wheels and/or the second set of wheels.

18. The storage system according to claim 15, wherein the first set of wheels and the second set of wheels comprise:
  a wheel having turning elements arranged perpendicular to a turning direction of the wheel.

19. The storage system according to claim 15, wherein a region of the first set of parallel rail comprises:
  a first roller arranged to rotate in the Y-direction, and the second set of parallel rails includes a roller arranged to rotate in the X-direction.

* * * * *